(12) United States Patent
Shidai et al.

(10) Patent No.: US 8,595,746 B2
(45) Date of Patent: Nov. 26, 2013

(54) METHOD AND APPARATUS FOR SCHEDULING TASKS TO CONTROL HARDWARE DEVICES

(75) Inventors: Takahiro Shidai, Obu (JP); Akihito Iwai, Chiryu (JP); Yohsuke Satoh, Kariya (JP)

(73) Assignee: Denso Corporation, Kariya (JP)

( * ) Notice: Subject to any disclaimer, the term of this patent is extended or adjusted under 35 U.S.C. 154(b) by 269 days.

(21) Appl. No.: 12/927,142

(22) Filed: Nov. 8, 2010

(65) Prior Publication Data

US 2011/0113431 A1    May 12, 2011

(30) Foreign Application Priority Data

Nov. 9, 2009 (JP) ................. 2009-256467
Feb. 26, 2010 (JP) ................. 2010-042655
Oct. 1, 2010 (JP) ................. 2010-224215

(51) Int. Cl.
*G06F 9/46* (2006.01)

(52) U.S. Cl.
USPC ........................................ 718/107; 718/102

(58) Field of Classification Search
None
See application file for complete search history.

(56) References Cited

U.S. PATENT DOCUMENTS

| | | | | |
|---|---|---|---|---|
| 5,590,323 | A * | 12/1996 | Kartalopoulos | 718/106 |
| 6,757,897 | B1 * | 6/2004 | Shi et al. | 718/102 |
| 2003/0018680 | A1 * | 1/2003 | Iglesias et al. | 709/100 |
| 2005/0146425 | A1 * | 7/2005 | Nath et al. | 340/457 |
| 2009/0113426 | A1 | 4/2009 | Mizuno | |

FOREIGN PATENT DOCUMENTS

| | | |
|---|---|---|
| JP | 09-081401 | 3/1997 |
| JP | H10-161890 | 6/1998 |
| JP | 2001-202258 | 7/2001 |
| JP | 2008-234116 | 10/2008 |
| JP | 2008-276666 | 11/2008 |
| JP | 2009-110404 | 5/2009 |
| JP | 2010-170320 | 8/2010 |

OTHER PUBLICATIONS hhttp://www.itmedia.co.jp/enterprise/articles/0612/15/news007.html (w/partial English translation.
hhttp://www.itmedia.co.jp/enterprise/articles/0709/26/news011.html (w/partial English translation.
Office Action issued Jul. 16, 2013 in corresponding JP Application No. 2010-224215 (with English translation).

* cited by examiner

*Primary Examiner* — Emerson Puente
*Assistant Examiner* — Sisley Kim
(74) *Attorney, Agent, or Firm* — Harness, Dickey & Pierce, PLC

(57) ABSTRACT

In a method of scheduling tasks for controlling hardware devices, a specified task having the execution right in a current time slice is terminated by depriving the execution right therefrom, when a time during which the execution right continues reaches the activation time given to the specified task. An identification process is performed when each reference cycle has been completed or each task has been terminated. In the identification process, i) when there remain, time-guaranteed tasks which have not been terminated in the current time slice, a time-guaranteed task whose priority is maximum among the remaining tasks is identified, and ii) when there remain no un-terminated time-guaranteed tasks in the current slice, of remaining non-time-guaranteed tasks which are not terminated yet in the current time slice, a non-time-guaranteed task whose priority is maximum is identified. The execution right is assigned to the identified task through the identification process.

26 Claims, 18 Drawing Sheets

FIG.3

| NAME | TYPE | MAXIMUM ACTIVATION DURATION | REQUIRED ACTIVATION TIME | IN-ITS ACTIVATION TIME | DS PRIORITY | TSS PRIORITY | TSS FIXED PRIORITY | TSS SUSPENDED DEGREE | OPERATION STATE |
|---|---|---|---|---|---|---|---|---|---|
| A TASK | DS | 1ms | 0.1ms | 0.1ms | 1 | — | — | — | ACTIVATION-COMPLETED STATE |
| B TASK | DS | 2ms | 0.6ms | 0.3ms | 2 | — | — | — | EVENT-WAITING STATE |
| C TASK | DS | 4ms | 0.8ms | 0.2ms | 3 | — | — | — | ACTIVE STATE |
| D TASK | TSS | — | — | 0.2ms | — | 20 | 20 | 0 | READY-TO-ACTIVATE STATE |
| E TASK | TSS | — | — | 0.1ms | — | 0 | 0 | 0 | READY-TO-ACTIVATE STATE |

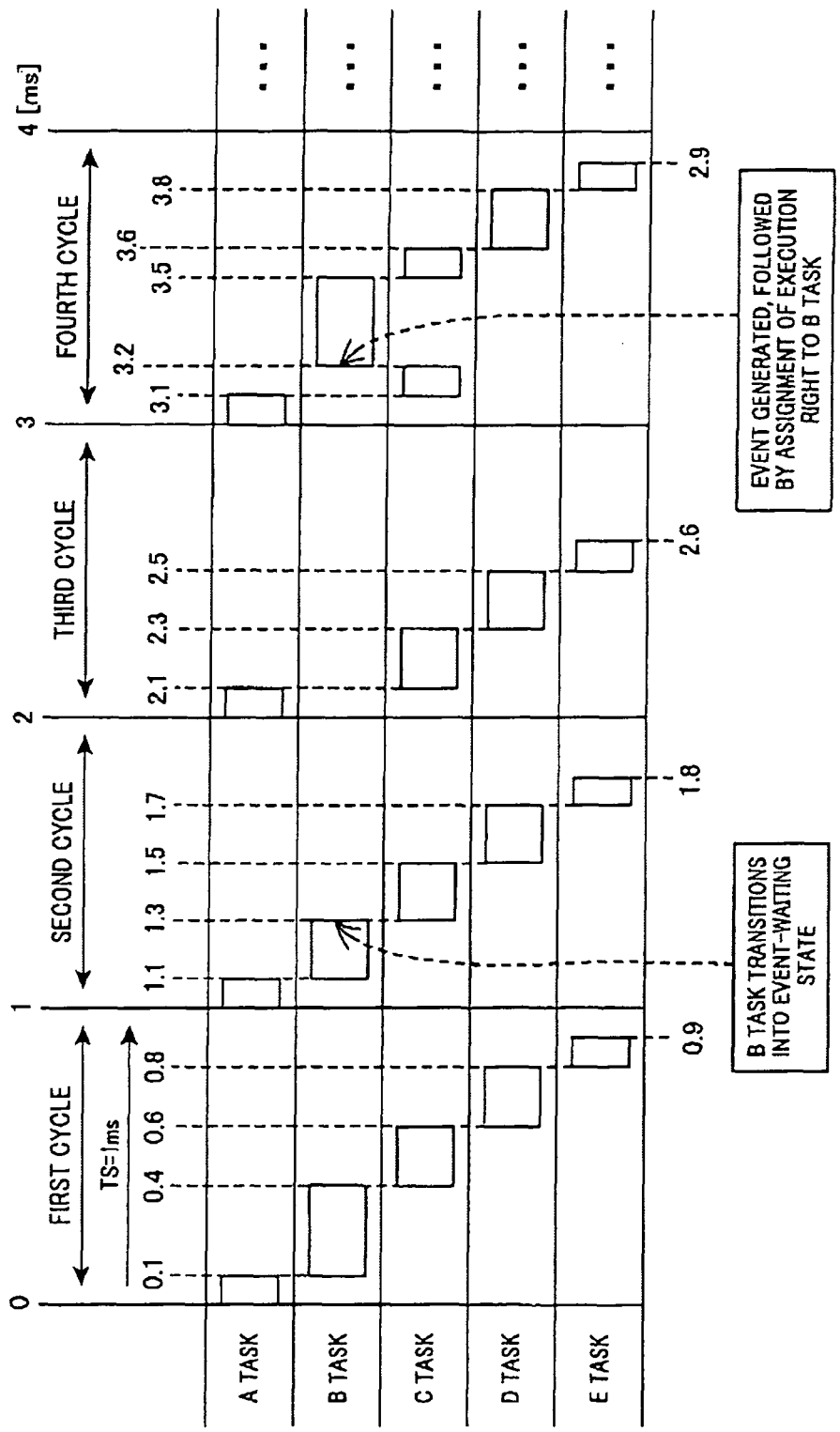

FIG.10A
(AT START OF FIRST CYCLE)

| NAME | TYPE | ... | ON-ITS ACTIVATION TIME | DS PRIORITY | TSS PRIORITY | TSS FIXED PRIORITY | TSS SUSPENDED DEGREE | OPERATION STATE |
|---|---|---|---|---|---|---|---|---|
| A TASK | DS | ... | 0.1ms | 1 | – | – | – | TO-BE-ACTIVATED STATE |
| B TASK | DS | ... | 0.3ms | 2 | – | – | – | TO-BE-ACTIVATED STATE |
| C TASK | DS | ... | 0.2ms | 3 | – | – | – | TO-BE-ACTIVATED STATE |
| D TASK | TSS | ... | 0.2ms | – | 20 | 20 | 0 | TO-BE-ACTIVATED STATE |
| E TASK | TSS | ... | 0.1ms | – | 0 | 0 | 0 | TO-BE-ACTIVATED STATE |

FIG.10B
(IMMEDIATELY AFTER TRANSITION TO EVENT-WAITING STATE)

| NAME | ... | DS PRIORITY | TSS PRIORITY | TSS FIXED PRIORITY | TSS SUSPENDED DEGREE | OPERATION STATE |
|---|---|---|---|---|---|---|
| A TASK | ... | 1 | – | – | – | ACTIVATION-COMPLETED STATE |
| B TASK | ... | 2 | – | – | – | EVENT-WAITING STATE |
| C TASK | ... | 3 | – | – | – | ACTIVE STATE |
| D TASK | ... | – | 20 | 20 | 0 | TO-BE-ACTIVATED STATE |
| E TASK | ... | – | 0 | 0 | 0 | TO-BE-ACTIVATED STATE |

FIG.10C
(AT START OF THIRD CYCLE)

| NAME | ... | DS PRIORITY | TSS PRIORITY | TSS FIXED PRIORITY | TSS SUSPENDED DEGREE | OPERATION STATE |
|---|---|---|---|---|---|---|
| A TASK | ... | 1 | – | – | – | TO-BE-ACTIVATED STATE |
| B TASK | ... | 2 | – | – | – | EVENT-WAITING STATE |
| C TASK | ... | 3 | – | – | – | TO-BE-ACTIVATED STATE |
| D TASK | ... | – | 20 | 20 | 0 | TO-BE-ACTIVATED STATE |
| E TASK | ... | – | 0 | 0 | 0 | TO-BE-ACTIVATED STATE |

FIG.10D
(IMMEDIATELY AFTER OCCURRENCE OF EVENT)

| NAME | ... | DS PRIORITY | TSS PRIORITY | TSS FIXED PRIORITY | TSS SUSPENDED DEGREE | OPERATION STATE |
|---|---|---|---|---|---|---|
| A TASK | ... | 1 | – | – | – | ACTIVATION-COMPLETED STATE |
| B TASK | ... | 2 | – | – | – | ACTIVE STATE |
| C TASK | ... | 3 | – | – | – | TO-BE-ACTIVATED STATE |
| D TASK | ... | – | 20 | 20 | 0 | TO-BE-ACTIVATED STATE |
| E TASK | ... | – | 0 | 0 | 0 | TO-BE-ACTIVATED STATE |

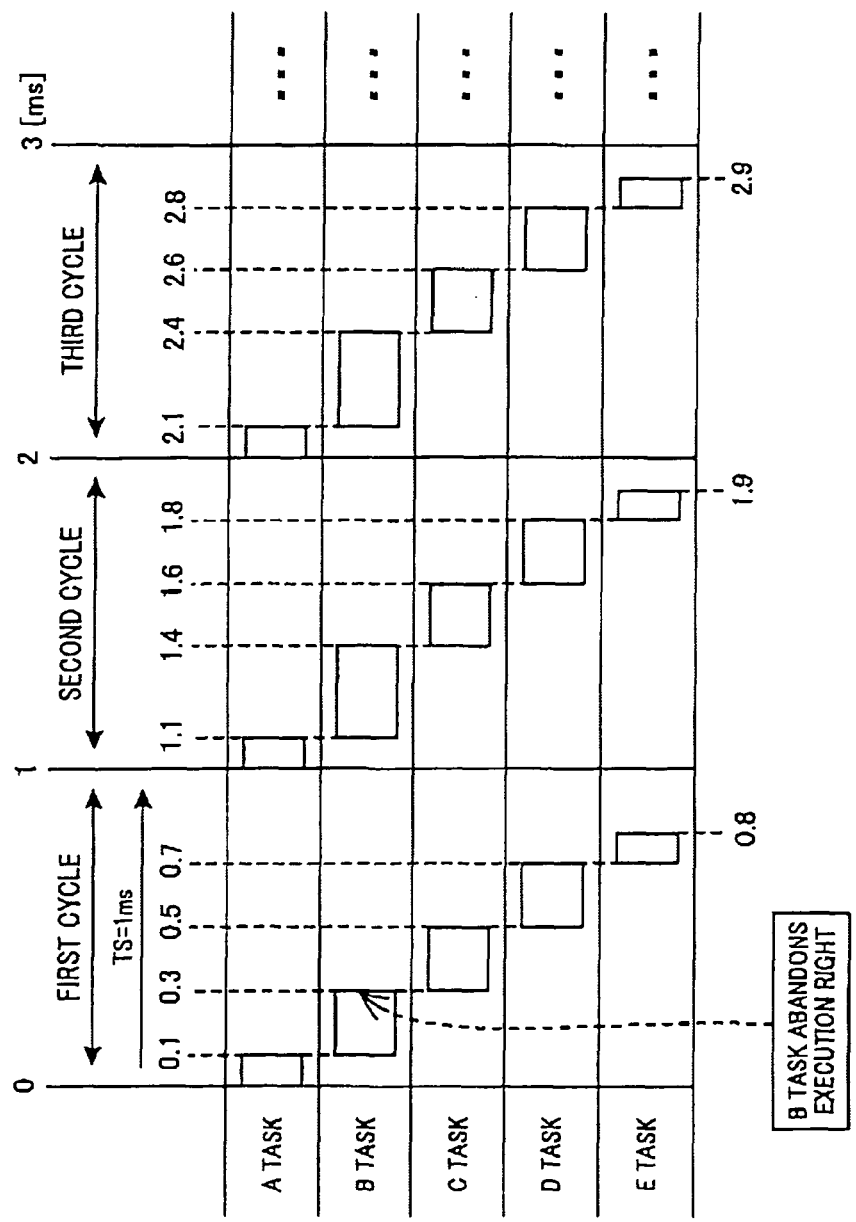

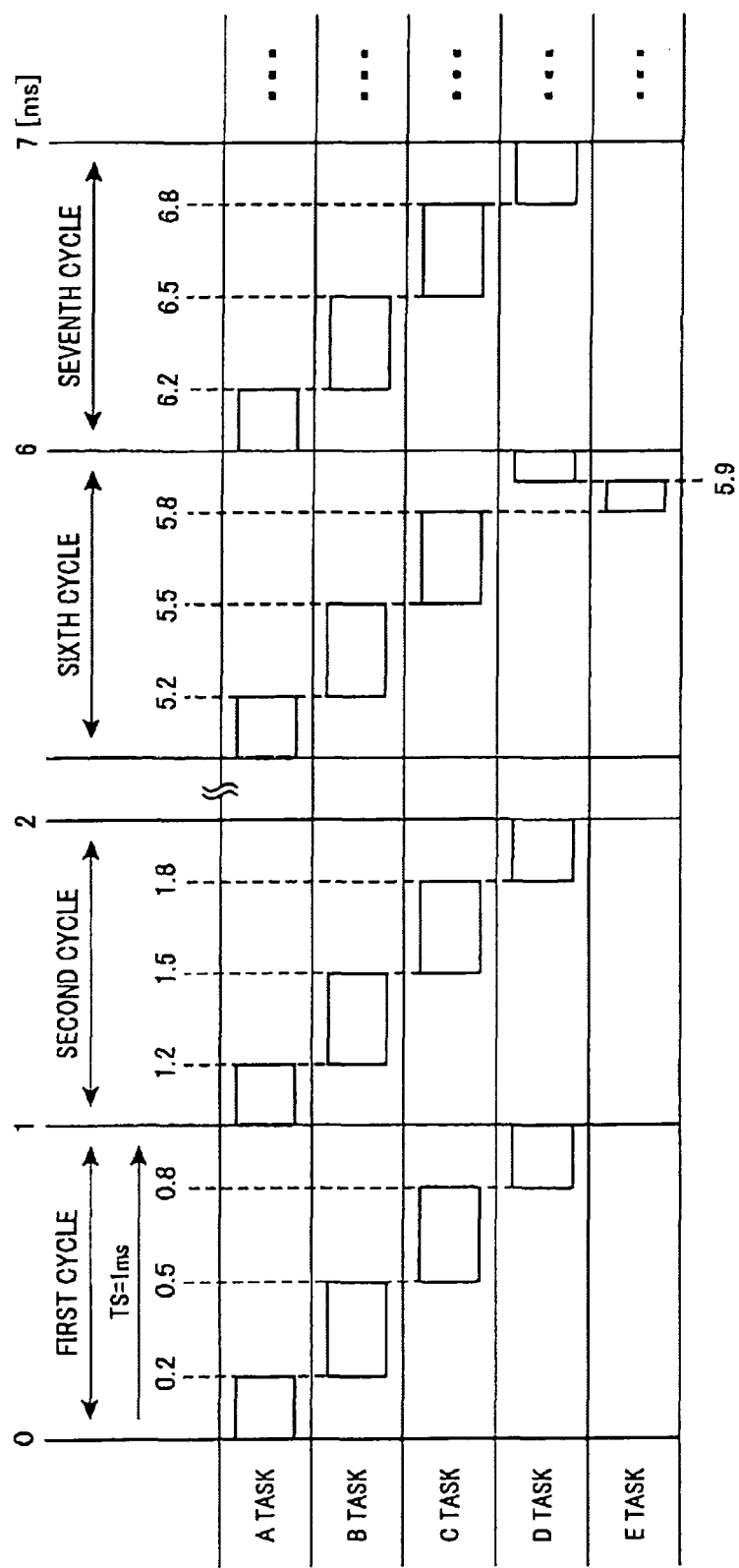

FIG.13A
(AT START OF FIRST CYCLE)

| NAME | TYPE | IN-ITS ACTIVATION TIME | DS PRIORITY | TSS PRIORITY | TSS FIXED PRIORITY | TSS SUSPENDED DEGREE | ACTIVATION STATE |
|---|---|---|---|---|---|---|---|
| ... | ... | ... | ... | ... | ... | ... | ... |
| A TASK | DS | 0.2ms | 1 | — | — | — | TO-BE-ACTIVATED STATE |
| B TASK | DS | 0.3ms | 2 | — | — | — | TO-BE-ACTIVATED STATE |
| C TASK | DS | 0.3ms | 3 | — | — | — | TO-BE-ACTIVATED STATE |
| D TASK | TSS | 0.2ms | — | 20 | 20 | 0 | TO-BE-ACTIVATED STATE |
| E TASK | TSS | 0.1ms | — | 0 | 0 | 0 | TO-BE-ACTIVATED STATE |

FIG.13B
(AT START OF SECOND CYCLE)

| NAME | ... | DS PRIORITY | TSS PRIORITY | TSS FIXED PRIORITY | TSS SUSPENDED DEGREE | ACTIVATION STATE |
|---|---|---|---|---|---|---|
| ... | ... | ... | ... | ... | ... | ... |
| A TASK | ... | 1 | — | — | — | TO-BE-ACTIVATED STATE |
| B TASK | ... | 2 | — | — | — | TO-BE-ACTIVATED STATE |
| C TASK | ... | 3 | — | — | — | TO-BE-ACTIVATED STATE |
| D TASK | ... | — | 20 | 20 | 0 | TO-BE-ACTIVATED STATE |
| E TASK | ... | — | 5 | 0 | 5 | TO-BE-ACTIVATED STATE |

FIG.13C
(AT START OF SIXTH CYCLE)

| NAME | ... | DS PRIORITY | TSS PRIORITY | TSS FIXED PRIORITY | TSS SUSPENDED DEGREE | ACTIVATION STATE |
|---|---|---|---|---|---|---|
| ... | ... | ... | ... | ... | ... | ... |
| A TASK | ... | 1 | — | — | — | TO-BE-ACTIVATED STATE |
| B TASK | ... | 2 | — | — | — | TO-BE-ACTIVATED STATE |
| C TASK | ... | 3 | — | — | — | TO-BE-ACTIVATED STATE |
| D TASK | ... | — | 20 | 20 | 0 | TO-BE-ACTIVATED STATE |
| E TASK | ... | — | 21 | 0 | 21 | TO-BE-ACTIVATED STATE |

FIG.13D
(AT START OF SEVENTH CYCLE)

| NAME | ... | DS PRIORITY | TSS PRIORITY | TSS FIXED PRIORITY | TSS SUSPENDED DEGREE | ACTIVATION STATE |
|---|---|---|---|---|---|---|
| ... | ... | ... | ... | ... | ... | ... |
| A TASK | ... | 1 | — | — | — | TO-BE-ACTIVATED STATE |
| B TASK | ... | 2 | — | — | — | TO-BE-ACTIVATED STATE |
| C TASK | ... | 3 | — | — | — | TO-BE-ACTIVATED STATE |
| D TASK | ... | — | 25 | 20 | 5 | TO-BE-ACTIVATED STATE |
| E TASK | ... | — | 19 | 0 | 19 | TO-BE-ACTIVATED STATE |

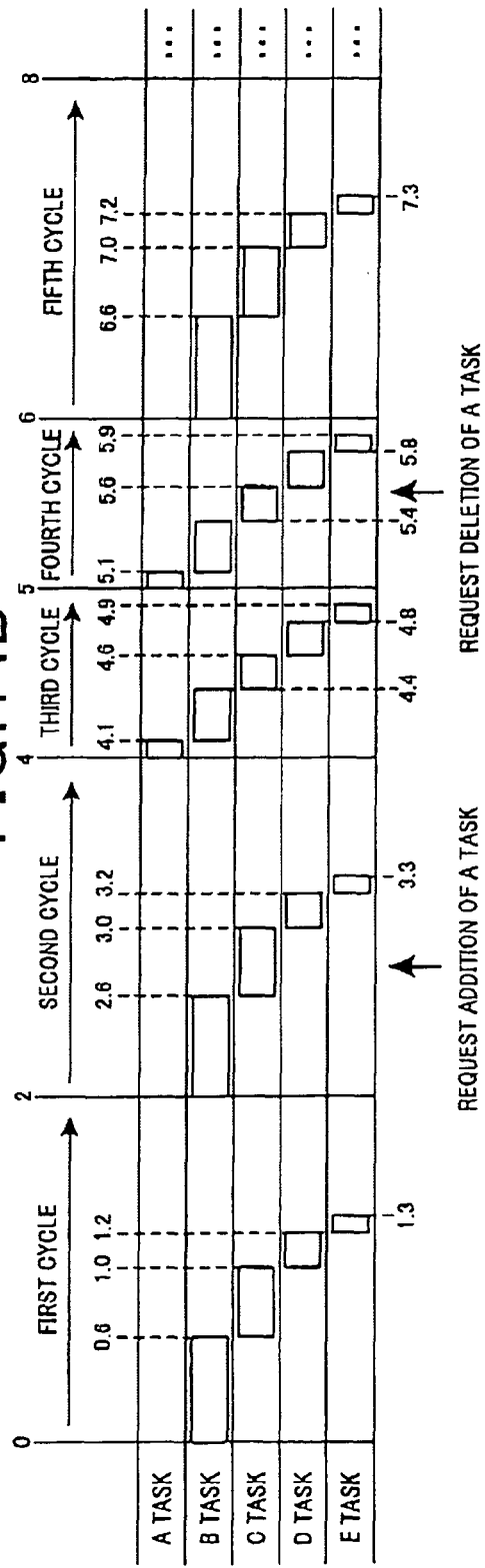

| NAME | MAXIMUM ACTIVATION DURATION | REQUIRED ACTIVATION TIME | IN-1TS ACTIVATION TIME | PRIORITY |
|---|---|---|---|---|
| A TASK | 1ms | 0.1ms | 0.14ms | 1 |
| B TASK | 2ms | 0.6ms | 0.3ms | 2 |
| C TASK | 4ms | 0.8ms | 0.54ms | 3 |

METHOD AND APPARATUS FOR SCHEDULING TASKS TO CONTROL HARDWARE DEVICES

CROSS-REFERENCE TO RELATED APPLICATION

This application is based on and claims the benefit of priorities from earlier Japanese Patent Application Nos. 2009-256467, 2010-224215 and 2010-042655 filed Nov. 9, 2009, Oct. 1, 2010 and Feb. 26, 2010, the descriptions of which are incorporated herein by reference.

BACKGROUND OF THE INVENTION

1. Technical Field of the Invention

The present invention relates a method and an apparatus for scheduling tasks to control hardware devices necessary to realize desired functions in an apparatus, such as vehicles.

2. Related Art

Techniques of virtualization are well known in which an operating system (OS), an application, and the like are activated on a virtualized computer. In an application of such a technique of virtualization, a computer that controls an existing device is virtualized, and a program used for controlling the existing device is activated on the virtualized computer to thereby easily re-create the existing device.

Owing to such a technique of virtualization, a virtual machine (also referred to as a "virtual computer"), which is a program for re-creating an existing device, can be fabricated for each of a plurality of existing devices. Further, the plurality of existing devices can be united into a single device by running these virtual machines within a single system.

At the same time with the unification of a plurality of existing devices into a single device, new functions different from those of the existing devices may be added. In this case, a dedicated application for realizing each of the new functions may be newly provided, and a virtual machine and the dedicated application may be scheduled as a task, for parallel operation of the existing devices and the tasks.

Thus, when virtual machines and respective dedicated applications are scheduled as tasks, an operation time (i.e., a duration for execution) is required to be appropriately allocated to each of the tasks. For example, when a virtual machine for controlling a vehicle and a dedicated application are scheduled as a task, real-time performance of the task is required to be ensured. To this end, an operation time allocated to each task in every predetermined period is required to be guaranteed.

In this regard, a known publication JP-A-2008-234116 discloses a virtual computer controller. In the virtual computer controller, tasks and interrupt handlers of the individual virtual computers are unitarily assigned with priorities. At the occurrence of an interrupt, the priority of the task of the virtual computer in operation is compared with the priority of the interrupt handler corresponding to the interrupt that occurred, to determine whether or not the interrupt handler should be executed.

According to the virtual computer controller disclosed in the patent document mentioned above, an interrupt handler corresponding to a virtual computer having lower priority is prevented from being executed when a virtual computer having higher priority is in operation. Thus, the virtual computer of higher priority can be smoothly operated. However, even when priorities are assigned to individual tasks, allocation of an operation time to each virtual computer in every predetermined period of time cannot be guaranteed. This means that the real-time performance of each virtual computer is not necessarily ensured.

SUMMARY

Hence, an object is to provide a scheduling method which is able to ensure real-time performance of specific tasks among the tasks which are subjected to scheduling.

An embodiment provides a method for scheduling a plurality of tasks given in an apparatus that produces periodical reference cycles, each of the reference cycles being given as a time slice, the tasks being given execution rights in sequence, the method including steps of: first performing the tasks, each of the tasks being given an activation time, the tasks including first type of tasks each of which is necessarily given the execution right during the activation time thereof in each of the time slices and second type of tasks each of which is not necessarily given the execution right during the activation time thereof in each of the time slices, a sum of the activation times given to the first type of tasks in each of the time slices being smaller than a period of each of the time slices, the first type of tasks respectively being given a first priority used to give the execution right and the second type of tasks respectively being given a second priority used to give the execution right; terminating, among the tasks, a specified task to which the execution right is given in a current time slice of the time slices, by depriving the execution right from the specified task, when a time during which the execution right continues reaches the activation time given to the specified task, the current time slice being a time slice beginning after the latest one reference cycle; second performing an identification process when each of the reference cycles has been completed or each of the tasks has been terminated, wherein in the identification process, i) in cases where there remain, among the first type of tasks, remaining first type of tasks which have not been terminated in the current time slice, a first type of task of which first priority is maximum among the remaining first type of tasks is identified, and ii) in cases where there remain no non-terminated first type of tasks in the current slice, then from the remaining second type of tasks which are not terminated yet in the current time slice, a second type of task of which second priority is maximum is identified; and assigning the execution right to the identified task through the identification process.

It should be appreciated that tasks may each be configured as a virtual machine that is a program for re-creating a function which is realized by an apparatus. Alternatively, tasks may each be configured as an application consisting of a single process unit or a plurality of process units for realizing the function.

Thus, the time-guaranteed tasks are each activated without fail over the activation time in each time slice to thereby guarantee an operation time in a predetermined cycle. Therefore, the term "activation time" itself can be defined as a duration which is longer than the shortest operation time given to each time-guaranteed task. The non-time-guaranteed tasks are sequentially assigned with an execution right during a period from the time of completing the activations of all of the time-guaranteed tasks up to the arrival of the subsequent reference cycle. Thus, according to the scheduling method of the first aspect, the time-guaranteed tasks and the non-time-guaranteed tasks are parallelly activated to ensure the real-time performance of each of the time-guaranteed tasks.

It should be appreciated that the identifying step does not necessarily have to be performed after a currently activated task (hereinafter also referred to as "active task") has been deprived of its execution right.

It may sometimes happen that, if some conditions are met in an active task, the task is no longer required to continue its activation (hereinafter also referred to as "to be active") in the present time slice.

Preferably, the method further comprises steps of: determining whether or not a predetermined abandonment condition for a task among the tasks is met, wherein the determination that the abandonment condition is met allows the task to voluntarily abandon the execution right given thereto; and regarding that the task has been terminated in the current time slice when the task abandons the execution right.

Thus, when a task assigned with an execution right is no longer required to be active in the present time slice, the activation of the task is ended, so that the operation time of the task can be allocated to a different task. Accordingly, each time slice is more effectively utilized for the activation of the individual tasks.

Further, a task assigned with an execution right may interrupt its own processing when some conditions are met and start waiting for the generation of an event.

Thus, it is desired that the method further comprises steps of: determining whether or not a predetermined event-waiting condition for a task among the tasks is met, wherein the determination that the event-waiting condition is met allows the task to voluntarily abandon the execution right given thereto and to wait for an event to be generated for the task; removing the task, which abandons the execution right and starts waiting, from the tasks to be given the execution right so that the removed task is waiting for the event; returning the waiting task to the tasks to be given the execution right when the event is generated, wherein the second performing step include a step of applying the identification process to the tasks which are not waiting, and a step of allowing the identification process to be performed when the task is removed from the tasks to be given the execution right in the removing step.

Thus, when a task has interrupted its activation and started waiting for the generation of an event, the task is permitted to stand by until an event is generated, for allocation of the operation time of the task to a different task. Accordingly, each time slice is more effectively utilized for the activation of the individual tasks.

Preferably, the second performing step includes a step of performing the identification process to identify the task returned by the returning step, and the method comprising a step of depriving the tasks of the execution rights thereof to which the execution rights are given currently, when the performing step identifies the returned task in the returning step.

Thus, when an event suitable for the stand-by task is generated, the stand-by task is activated replacing the active task (the task assigned with an execution right); on condition that the priority of the active task is lower than that of the stand-by task. Accordingly, a response time is shortened, the response time being the time taken before the process corresponding to the generated event is performed.

It may sometimes happen that a stand-by task is restored as a task to be assigned with an execution right, when any one of the tasks is assigned with an execution right (i.e. when any one of the tasks is active). As a matter of course, the active task in this case is yet to complete its activation in the present time slice. In this case, the task having the highest priority is identified, at the identifying step, from among the tasks, including the active task, whose activations are yet to be completed.

As already mentioned above, non-time-guaranteed tasks are activated during the period from the time point of completing the activation of time-guaranteed tasks up to the arrival of the subsequent reference cycle. Therefore, the non-time-guaranteed tasks are each not necessarily allocated with an operation time in each time slice.

It is preferred that the method further comprises a step of updating the second priority assigned to the second type of tasks depending on whether or not each of the second type of tasks has been terminated in the current time slice.

Thus, when a non-time-guaranteed task is assigned with an execution right effective over its activation time, the second priority of the task is lowered so that the task is unlikely to be assigned with an execution right in the subsequent time slices. When a non-time-guaranteed task Is not assigned with an execution right effective over its activation time, the second priority of the task is raised so that the task is likely to be assigned with an execution right in the subsequent time slices. Accordingly, distribution of operation times to non-time-guaranteed tasks can be controlled over the period of a plurality of time slices.

The second priority may be calculated as follows.

Specifically, the second priority is calculated on a fixed priority providing a fixed value of the priority and a suspended degree showing how much of the second type of tasks have not terminated in each of the time slices, and the updating step updates the second type of tasks by updating the suspended degree depending on whether or not each of the second type of tasks has been terminated in the current time slice.

Thus, distribution of operation times to non-time-guaranteed tasks in the period over a plurality of time slices can be controlled, considering the unique priorities determined according to the properties of the non-time-guaranteed tasks.

For each time-guaranteed task, a maximum activation duration and a minimum activation time are set. The maximum activation duration is allowed for guaranteeing a normal activation. The minimum activation time is required for guaranteeing the normal activation in each activation cycle. Let us assume that a time-guaranteed task 1 and a time-guaranteed task 2 are provided and that these tasks are to be scheduled. The time-guaranteed task 1 has the maximum activation duration set to 1 ms and the minimum activation time set to 0.2 ms in each activation cycle. The time-guaranteed task 2 has the maximum activation duration set to 4 ms and the activation time set to 2 ms in each activation cycle. Since at least 2 ms is required for the activation of the time-guaranteed task 2, the time-guaranteed task 1 cannot be activated at a cycle of 1 ms. Therefore, the normal activation of the time-guaranteed task 1 cannot be guaranteed.

It is also preferred that each of the first type of tasks has a maximum activation duration and a required activation time, the maximum activation duration being a maximum activation duration allowed for normally activating functions realized by the first type of tasks, the required activation time being a minimum provided time of the execution right necessary with for activating the functions in the maximum activation duration, the method including steps of: setting, as the time slice, the maximum activation duration which is shortest among the maximum activation durations of the first type of tasks to be scheduled; and calculating a value by dividing the necessary activation time which is set to each of the first type of tasks to be scheduled by the maximum activation duration which is set to each of the first type of tasks to be scheduled; calculating a minimum activation time of each of the first type of tasks by multiplying the calculated value by the time slice; and setting, as the activation time, a time which is longer than the minimum activation time of each of the first type of tasks such that a sum of the activation times of all the first type of tasks is limited within the time slice.

Thus, the time-guaranteed tasks are activated using, as a cycle, a time slice that is a time period equal to or less than the maximum activation duration. Accordingly, the interval between the activations of a time-guaranteed task is prevented from becoming longer than the maximum activation duration. Also, the minimum activation time is calculated for each time-guaranteed task by dividing the required activation time by the maximum activation duration and by multiplying the resultant value with the time slice. In each time slice, each time-guaranteed task is activated at least over the minimum activation time. Thus, even for a time-guaranteed task having a maximum activation duration longer than the time slice, at least an operation time corresponding to the required activation time is ensured in each maximum activation duration. In this way, the time-guaranteed tasks can be activated in parallel in a normal state.

The tasks to be subjected to scheduling may sometimes be dynamically added or deleted. Taking such a case into consideration, a configuration as set forth below may be provided.

Preferably, the method comprises steps of: removing the task to be scheduled so that the task is not scheduled; and adding the task which has not been scheduled so that the task is newly added to be a task to be scheduled, wherein the time slice setting step, the value calculating step, the minimum activation time calculating step, and the activation time setting step are repeated at intervals.

Thus, when the tasks to be scheduled are added or deleted, the time slice and the activation time of each time-guaranteed task are appropriately updated.

If the number of time-guaranteed tasks to be scheduled are increased too much, these tasks may not all be activated over the respective activation times in the time slice. As a result, real-time performance of the time-guaranteed tasks is deteriorated.

Still preferably, the method further comprises steps of: determining whether or not, when a new task belonging to the first type of tasks to the tasks to be scheduled, it is possible to add the new task to the tasks to be scheduled, based on the maximum activation duration and the minimum activation time of the new task and the maximum activation durations and the minimum activation times of the first type of tasks to be scheduled, wherein the adding step adds the new task to the tasks to be scheduled when the determining step determines that it is possible to add the new tasks to the tasks to be scheduled.

Thus, a new time-guaranteed task is added only when the activation over the activation time is ensured in the time slice for each of the new time-guaranteed task to be added and the time-guaranteed tasks already permitted to be scheduled. Accordingly, real-time performance of the time-guaranteed tasks is prevented from being deteriorated by the addition of the new time-guaranteed task.

When the time slice, the activation time, or the like is updated while a task is active over its activation time, the activation time of the task may not be appropriately ensured.

It is preferred that the time slice setting step, the value calculating step, the minimum activation time calculating step, and the activation time setting step are executed every time when timing defined by the reference cycles is clocked.

Thus, the time slice and the activation times of the respective tasks are set at the time point when a round of the tasks is made, whereby the activation time of each task is appropriately ensured.

As already mentioned above, each task may be configured as an application consisting of a single process unit or a plurality of process units for realizing a function.

Alternatively, at least one of the tasks is a virtual machine composed by a program re-create a function realized in an apparatus.

Thus, when, for example, a plurality of devices are combined into a single device using the technique of virtualization, real-time performance can be guaranteed for each of the specific virtual machines.

The scheduling method having the first to the eleventh aspects as described above may be marketed as a virtual machine control program for realizing the scheduling method by a computer (twelfth aspect). Alternatively, the scheduling method may be marketed as a scheduling apparatus for realizing the scheduling method (thirteenth aspect). In these cases as well, the effects similar to those of the scheduling method described above are achieved.

Below Is a discussion about the scheduling of tasks each configured as a virtual machine in a hard real-time system, such as on-vehicle equipment. Such on-vehicle equipment as a hard real-time system is likely to suffer a fatal problem when time requirements are not met even for a moment. In such a case, a maximum activation duration and a minimum activation time can be set for each task. The maximum activation duration is allowed for guaranteeing a normal activation. The minimum activation time is required for guaranteeing the normal activation in each activation cycle.

Assume that a task 1 and a task 2 are provided and that these tasks are to be scheduled. The task 1 has the maximum activation duration of 1 ms and the minimum activation time of 0.2 ms in each activation cycle. The task 2 has the maximum activation duration of 4 ms and the minimum activation time of 2 ms in each activation cycle. Since at least 2 ms is required for the activation of the task 2, the task 1 cannot be activated at a cycle of 1 ms. Therefore, the normal activation of the task 1 cannot be guaranteed.

As a countermeasure against this, scheduling may be performed using a method as set forth below. In this case, scheduling is carried out in an apparatus that produces periodically arriving timing as a reference cycle, divides one reference cycle that is a time slice for allocation as an activation time to each of a plurality of tasks to be scheduled, and runs each task to be scheduled over the allocated activation time in each time slice.

Specifically, a maximum activation duration and a required activation time may be set in each task. The maximum activation duration is allowed for re-creating a function in a normal state. The required activation time is required for re-creating the function in a normal state in each maximum activation duration.

This scheduling method may include: a time slice setting step for setting a shortest maximum activation duration as a time slice from among the maximum activation durations of a plurality of tasks to be scheduled; and an activation time setting step for calculating, for each task to be scheduled, a value by dividing the required activation time set for the task by the maximum activation duration set for the task, and calculating a value as a minimum activation time by multiplying the resultant value of the division with the time slice to thereby set a time equal to or more than the minimum activation time as an activation time.

At the activation time setting step, the activation time of each task may be set so as to fall within a range where the sum of the activation times will not exceed the time slice.

The term "task" may refer to the virtual machine mentioned above or may refer to an application for realizing a given function.

Thus, the tasks are activated using, as a cycle, a time slice that is a time period equal to or less than the maximum activation duration. Accordingly, the interval between the activations of a task is prevented from becoming longer than the maximum activation duration. Also, the minimum activation time is calculated for each task by dividing the required activation time by the maximum activation duration and by multiplying the resultant value with the time slice. In each time slice, each task is activated at least over the minimum activation time. Thus, even for a task having a maximum activation duration longer than the time slice, at least an operation time corresponding to the required activation time is ensured in each maximum activation duration. In this way, the plurality of tasks can be activated in parallel in a normal state.

If the activation time of each task to be scheduled is set to the minimum activation time, a vacant period in which no task is activated is likely to be caused in each time slice.

Therefore, the above scheduling method may further include a provisional activation time calculating step. At this step, the maximum activation durations set for the respective tasks to be scheduled are summed up. Then, for each task, the maximum activation duration is divided by the sum, and the resultant value is multiplied with the time slice to obtain a provisional activation time.

Then, a task in which the provisional activation time is shorter than the minimum activation time may be provided as a time-deficit task, and a task in which the provisional activation time is longer than the minimum activation time may be provided as a time-excess task. For the time-deficit tasks, the difference between the provisional activation time and the minimum activation time may be regarded as a deficit time. For the time-excess tasks, the difference between the provisional activation time and the minimum activation time may be regarded as an excess time.

The provisional activation time setting step may include: a task setting procedure for setting one or more time-excess tasks for any one of time-deficit tasks; an added time setting procedure for setting a time equal to or more than the deficit time as an added time, for the time-deficit task involved in the task setting procedure; and a subtracted time setting procedure for setting a subtracted time that is a time equal to or less than the excess time, for each of the time-excess tasks set in the task setting procedure, so that a sum of the subtracted times is equal to the added time for the time-deficit task involved in the task setting procedure.

At the activation time setting step, the setting procedure is performed for all of the time-deficit tasks. In the setting procedure, for each of all the time-deficit tasks, a time obtained by adding the provisional activation time and the added time may be used as an activation time. Also, for each of all the time-excess tasks, a time obtained by subtracting the subtracted time from the provisional activation time may be used as an activation time.

Thus, the value resulting from the division of the maximum activation duration by the sum of the maximum activation durations is multiplied with the time slice to use the resultant time as a provisional activation time of each task. Thus, the time slice is divided for allocation to the individual tasks without causing an excess time. Also, the provisional activation time is shared out from a task in which the provisional activation time is longer than the minimum activation time, to a task in which the provisional activation time is shorter than the minimum activation time. Thus, a time equal to or more than the minimum activation time is allocated to each task. In this way, the time slice is divided into operation times (i.e., operation durations) of the respective tasks without causing a vacant period, whereby tasks are activated more efficiently.

Further, tasks to be scheduled may sometimes be dynamically added or deleted. In such a case, the configuration set forth below may be used.

Specifically, the above scheduling method may further include: a deleting step for deleting tasks subjected to scheduling; and an adding step for newly adding tasks not yet subjected to scheduling. In this configuration, the time slice setting step and the activation time setting step may be performed periodically.

Thus, a time slice and the activation time of each task to be scheduled are appropriately updated even when a task to be scheduled has been added or deleted.

If the tasks to be scheduled are increased too much, these tasks may not all be activated over the respective activation times in the time slice. Therefore, the tasks may no longer be activated in a normal state.

Therefore, the above scheduling method may further include: a determining step for determining whether or not addition of a new task to be scheduled is allowable in adding the new task as an object of scheduling, based on the maximum activation duration and the minimum activation time of the new task to be added and the maximum activation durations and the minimum activation times of the tasks already permitted to be scheduled. At the adding step, the new task is added as an object of scheduling when an affirmative determination is made at the determining step.

Thus, a new task to be scheduled is added only when the new task and the tasks already permitted to be scheduled can be activated over the respective activation times. Accordingly, the normal activation of each task will not be deteriorated by the addition of the new task.

When a time slice, an activation time, or the like is updated while a task is active over the activation time, the operation time of the task may no longer be appropriately ensured.

Therefore, in the above scheduling method, the setting step may be performed when the timing of the reference cycle has arrived.

Thus, a time slice or the activation time of each task can be set at the time point when one round of the individual tasks is made, whereby the operation time of each task is appropriately ensured.

A task may be required to have real-time performance.

In the above scheduling method, at least any one of the tasks to be scheduled may be required to have real-time performance. In the task, the maximum activation duration may be allowed for ensuring the real-time performance, while the required activation time may be a minimum activation time required for ensuring the real-time performance in each maximum activation duration.

Thus, a plurality of tasks are activated in parallel with the real-time performance thereof being maintained.

The above scheduling method may be marketed as a scheduling program for realizing the scheduling method by a computer, or as an apparatus for realizing the scheduling method. In these cases as well, the effects similar to those of the above scheduling method are exerted.

BRIEF DESCRIPTION OF THE DRAWINGS

In the accompanying drawings:

FIG. 3 illustrates a task management table according to the first embodiment;

FIG. 9 Is a timing diagram illustrating operation times (operation durations) of A to E tasks of the control program according to the first embodiment;

FIGS. 10A to 10D each Illustrate a task management table according to the first embodiment;

FIG. 11 is a timing diagram illustrating operation times of A to E tasks of the control program according to the first embodiment;

FIG. 12 is a timing diagram illustrating operation times of A to E tasks of the control program according to the first embodiment;

FIGS. 13A to 13D each illustrate a task management table according to the first embodiment;

FIG. 14A illustrates a task management table when task addition or deletion is performed, according to the first embodiment;

FIG. 14B is a timing diagram illustrating operation times of A to E tasks when the task addition or deletion is performed, according to the first embodiment;

DETAILED DESCRIPTION OF THE PREFERRED EMBODIMENTS

With reference to the accompanying drawings, hereinafter are described some embodiments of the present invention. It should be appreciated that the embodiments of the present invention are not limited to the ones set forth below, but may be variously changed as far as the change falls in the technical scope of the present invention.

[First Embodiment]

Referring, first, to FIGS. 1A and 1B to FIGS. 14A and 14B, on-vehicle equipment 100 and a control program 1 installed in the on-vehicle equipment 100 according to a first embodiment of the present invention will be described.

The on-vehicle equipment 100 includes an ACC (adaptive cruise control) function, a LKA (lane keeping assist) function, a perimeter monitoring function, a car navigation function and an audio function. The ACC function monitors a distance between the vehicle installed with the on-vehicle equipment 100 (hereinafter also referred to as "the vehicle concerned" or just as "the vehicle") and a preceding vehicle to reduce the speed of the vehicle concerned if the inter-vehicle distance becomes small to thereby ensure the inter-vehicle distance. The LKA function gives warning or assists the steering wheel manipulation when the vehicle concerned in motion almost strays out of the travel lane. The perimeter monitoring function monitors the perimeter of the vehicle concerned using a camera, radar, or the like to detect obstacles around the perimeter of the vehicle for notification to the driver. The car navigation function gives information on the current position of the vehicle concerned or provides the vehicle concerned with routing assistance up to a destination. The audio or audiovisual function reproduces the contents of music or the contents of images, or gives audio/visual information through various broadcasts.

Figure 1A:
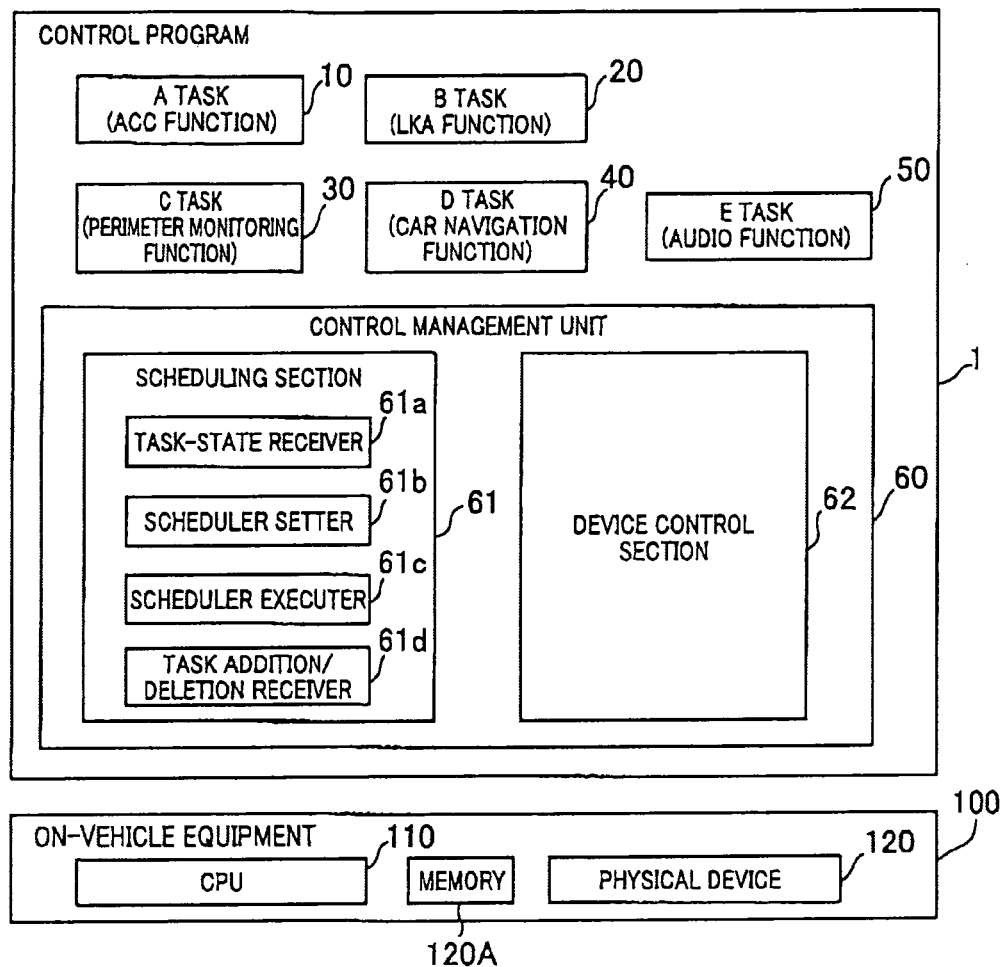
FIG. 1A is a block diagram illustrating the configuration of on-vehicle equipment and the configuration of a control program, according to a first embodiment of the present invention.
Figure 1B:
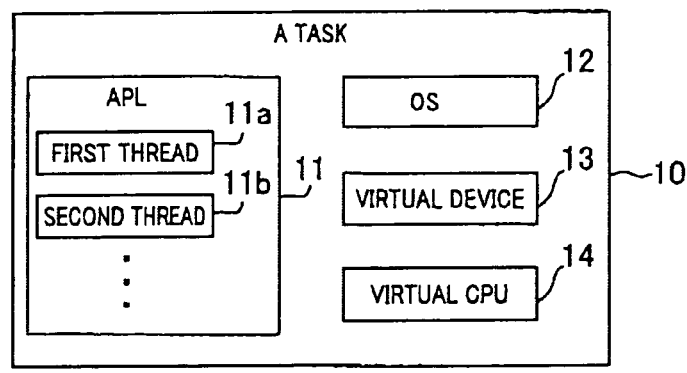
FIG. 1B is a block diagram illustrating an A task of the control program, which is configured as a virtual machine.

FIG. 1A is a block diagram illustrating the configuration of the on-vehicle equipment 100 including a CPU 110 and a physical device 120, and the configuration of the control program 1 installed in the on-vehicle 100, which program is executed by the CPU 110. The control program 1 is stored in a memory 120A configured by a device not requiring a memory holding action, such as a flash memory, in the physical device 120.

The control program 1 includes an A task 10 for realizing the ACC function, a B task 20 for realizing the LKA function, a C task 30 for realizing the perimeter monitoring function, a D task 40 for realizing the car navigation function, and an E task 50 for realizing the audio function. The control program 1 also includes a control management unit 60 for running the A to E tasks 10 to 50.

The A to E tasks 10 to 50 may each be configured as a virtual machine that is a program for wholly or partially re-creating the function to be realized in a given device. FIG. 15 is a block diagram illustrating, as an example, a configuration of the A task 10 configured as a virtual machine.

The A task 10 includes an APL (a programming language) 11, an OS (operating system) 12 or the like, a virtual device 13 and a virtual CPU (central processing unit) 14. The APL 11 includes a program that has been implanted in the form of binary codes, which program has been run in a device associated with the function to be re-created. The virtual device 13 and the virtual CPU 14, which are so-called virtualized hardware, are programs for emulating the APL 11 and the OS12 or the like.

The OS 12 is a known OS that schedules a first thread 11a, a second thread 11b, and the like configuring the APL 11.

The virtual CPU 11 is a program that analyzes the binary codes of the APL 11, and the OS 12 or the like and puts them into operation.

The virtual device 13 is a program that serves as an interface (I/F) between the APL 11 and the OS 12 or the like, and the physical device 120 of the on-vehicle equipment 100. The APL 11 and the OS 12 or the like control the physical device 120 by accessing the virtual device 13.

The A to E tasks 10 to 50 do not necessarily have to be virtual machines, but may each be configured as a program consisting of a single process unit for realizing a corresponding function, or as a program consisting of a plurality of process units (i.e. a plurality of threads).

In the present embodiment, the A to C tasks 10 to 30 are the tasks that each require real-time performance in which a response time for an input from the outside falls within a predetermined range. If these tasks are configured as virtual machines, the OS in each of the virtual machines is configured as a real-time OS.

The control management unit 60 will be explained.

The control management unit 60 includes a scheduling section 61 and a device control section 62. The scheduling section 61 sequentially assigns an execution right to the A to E tasks 10 to 50 to schedule these tasks. The device control section 62 controls the physical device 120 according to the instructions given by each task (given by a virtual device of each task, if each task is configured as a virtual machine), and transmits signals from the physical device 120 to each task (or to the virtual device of the task).

The scheduling section 61 includes a task-state receiver 61a, a scheduler setter 61b, a scheduler executer 61c and task addition/deletion receiver 61d. The task-state receiver 61a receives information, such as on the abandonment of an execution right, from the tasks. The scheduler setter 61b defines an activation state of a task based such as on the information received by the task-state receiver 61a, while assigning an execution right to each task. The scheduler executer 61c runs a task assigned with an execution right. The task addition/deletion receiver 61d adds or deletes tasks to be scheduled.

When an execution right is assigned to a task configured as a virtual machine mentioned above, threads are scheduled by an OS in the virtual machine to run the threads in parallel. When a task configured by a plurality of threads is assigned with an execution right as well, the threads are scheduled in the task by an OS in a similar manner.

The operation of the control program 1 according to the first embodiment will be explained.

First, an outline of task scheduling which is performed in the scheduling section 61 is explained.

The scheduler setter 61b of the scheduling section 61 sets a reference cycle by producing periodically arriving timing. In a time slice (hereinafter also referred to as "TS") that corresponds to one reference cycle, the scheduler setter 61b sequentially assigns an execution right to the A to E tasks to run these tasks in parallel.

As already described above, the A to C tasks are each required to give a real-time performance, and hence these tasks are each required to be guaranteed with a predetermined operation time in every predetermined period. Thus, the scheduler setter 61b sets a TS suitable for the A to C tasks (as will be specifically described later). The scheduler setter 61b then sequentially assigns an execution right to the A to C tasks in each TS to ensure the real-time performance of each of the tasks over the required time.

It should be appreciated that, when a term "in-1TS activation time (activated duration)" is referred to herein, it means a period of time, that is, an operation time (a duration for operation), required for each task in a TS in order to ensure its real-time performance. Also, when a term "definite scheduling (also referred to as "DS")" is referred to herein, it means scheduling for tasks requested with real-time performance.

It should also be appreciated that a sum of the in-1TS activation times of the A to C tasks subjected to DS (hereinafter, such tasks are also referred to as "DS tasks") is smaller than a TS. Thus, when an execution right effective over the in-1TS activation time has been given to each of these tasks, there will be a vacant time before the subsequent TS is started. The scheduler setter 61b uses this vacant time to assign an execution right to each of the D and E tasks.

The scheduling performed for the D and E tasks in this way is referred to as "time share scheduling (also referred to as "TSS")". Regarding each of the D and E tasks subjected to TSS (hereinafter, such tasks are also referred to as "TSS tasks") as well, a time in a TS is given being assigned with an execution right. This time is also referred to as "in-1TS activation time". However, the length of the vacant time after finishing the DS is not guaranteed. Accordingly, in each TS, the TSS tasks will not each be necessarily assigned with an execution right effective over the in-1TS activation time.

Hereinafter, behaviors and activation states of the tasks will be explained.

Upon assignment of an execution right to a task by the scheduler setter 61b, the activation of the task is started by the scheduler executer 61c. In this case, tasks which are being activated (hereinafter referred to as "active tasks") will each voluntarily abandon its execution right if predetermined abandonment conditions are met. The abandonment conditions may, for example, be that a specific signal is inputted to an active task from the physical device 120. If the active task in question is a virtual machine, the virtual device of the virtual machine receives the specific signal from the physical device 120 via the device control section 62, thereby detecting the input of the specific signal into the active task in question.

In addition, active tasks will each voluntarily abandon its execution right when predetermined event-waiting conditions are met, and start waiting for generation of a predetermined event. The event-waiting conditions or events may, for example, be that a specific signal is inputted to an active task from the physical device 120, or may be that specific instructions are given from a different task.

The activation states of a task include: a ready-to-activate state where an execution right effective over an in-1TS activation time in a TS has not been assigned; an active state where an execution right has been assigned; an activation-completed state where an execution right effective over an in-1TS activation time in a TS has been assigned and the activation in the TS has been completed; and an event-waiting state where generation of an event is waited for.

Once a task is brought into an activation-completed state, the scheduler setter 61b will not again assign an execution right to the task in the same TS. Also, the scheduler setter 61b will not assign an execution right to a task in the event-waiting state.

Setting of a TS and the like will be explained.

Figure 2:
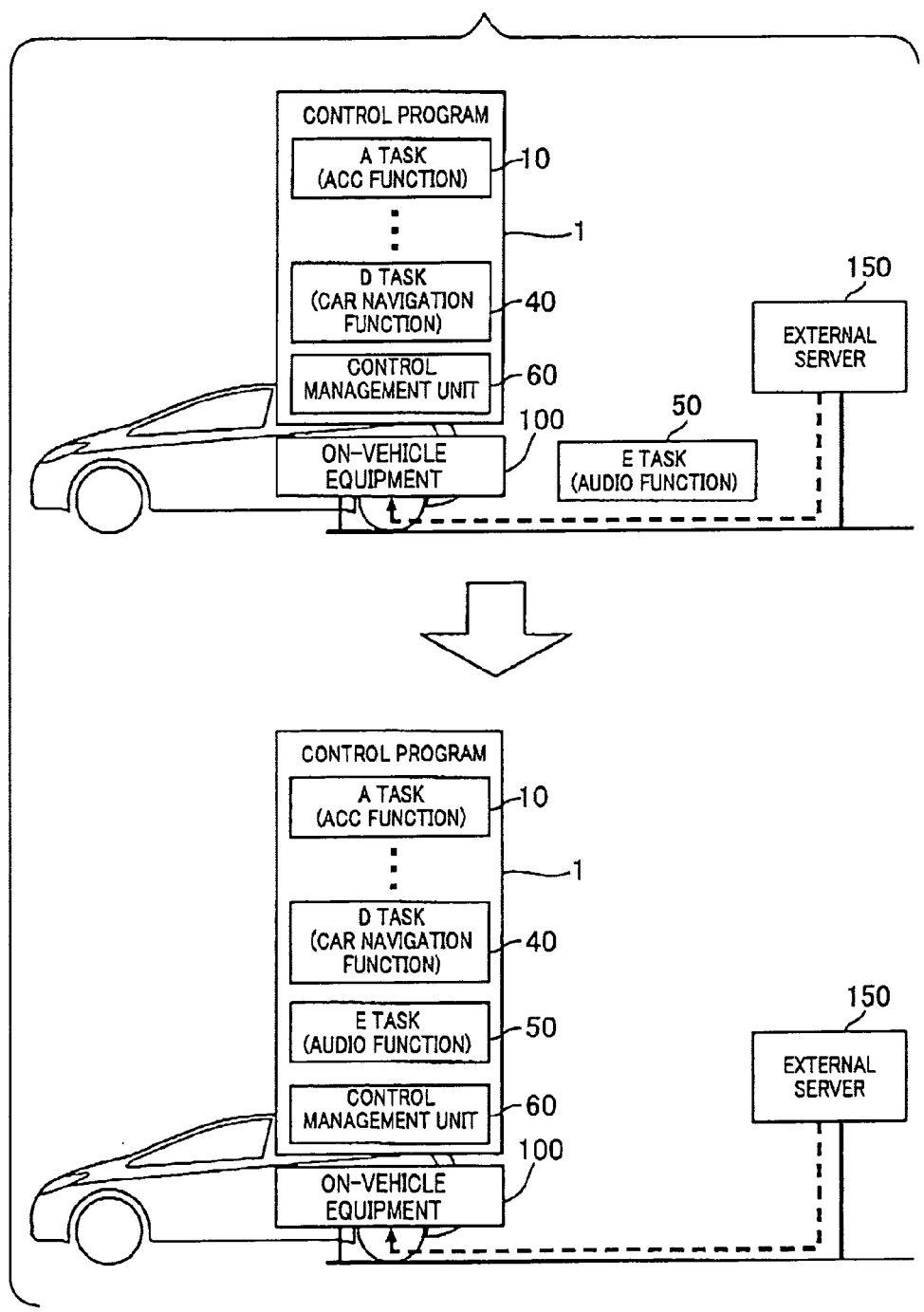
FIG. 2 is an explanatory diagram illustrating how a task is downloaded from an external server and added as an object to be scheduled.

FIG. 2 is an explanatory diagram illustrating how a task is downloaded from an external server and added as an object to be scheduled. As shown in FIG. 2, the on-vehicle equipment 100 has radio communication with an external server 150 via a mobile phone or the like, not shown, to download a new task from the external server 150 for storage in a memory. The on-vehicle equipment 100 also adds the downloaded task to objects to be scheduled. Further, in response to the instructions from a user, the on-vehicle equipment 100 can newly add a task stored in the memory to the objects to be scheduled, or can delete a task from the objects to be scheduled. When a task to be scheduled has been added or deleted, a TS and an in-1TS activation time for each of the DS tasks are determined.

Regarding a task requested to give a real-time performance (DS task), a maximum activation duration and a required activation time are determined. The maximum activation duration refers to a maximum period allowed for ensuring the real-time performance of the task and for normally running the function of the task. The required activation time refers to a minimum time in each maximum activation duration, which minimum time is required for ensuring the real-time performance of the task and for normally running the function of the task.

An explanation is given here, taking as an example the C task that is a virtual machine for realizing the perimeter monitoring function. In the C task, the information collected such as from a camera and a radar is analyzed to determine the presence/absence of obstacles around the perimeter of the vehicle concerned. If the time required for this determination process is insufficient, detection of the obstacles is likely to be delayed, or the detection may be disabled. Considering this, a time required for reliably performing the determination process is measured, using a perimeter monitoring device re-created by the virtual machine configuring the C task. The required activation time may then be calculated based such as on the measured time and a ratio of an operation clock between the perimeter monitoring device and the on-vehicle equipment 100.

In addition to this, the maximum activation duration and the required activation time may be defined based, for example, on the results of emulation or simulation of the task in question, or may be defined based such as on an algorithm of the task in question.

When tasks are added or deleted, the scheduler setter 61b determines, as a TS, the smallest one of the maximum activation durations of the tasks each required to give a real-time performance. Further, the scheduler setter 61b determines an in-1TS activation time of the task required to give a real-time performance, based on the maximum activation duration and the required activation time of the task (details will be described later).

Subsequently, a task management table is explained, which table indicates the in-1TS activation times and the like of the A to E tasks. FIG. 3 illustrates an example of the task management table. The task management table is managed by the scheduler setter 61b of the scheduling section 61.

The task management table includes such items as "name" indicating the name of a task, "type" indicating a mode of scheduling (DS or TSS), "in-1TS activation time" indicating an in-1TS activation time, and "activation state" indicating an activation state of a task.

Items for the DS tasks (tasks required to give a real-time performance) include "maximum activation duration" indicating a maximum activation duration, "required activation time" indicating a required activation time, and "DS priority" indicating order of priority for assigning an execution right in DS. The "DS priority" is determined is based such as on the maximum activation duration of each DS task. Also, in the "DS priority", the smaller the value is, the higher becomes the priority order. The details of the "DS priority" will be described later.

Items for the TSS tasks include "TSS priority" indicating order of priority for assigning an execution right in TSS, "TSS fixed priority" indicating a value used for calculating priority of TSS, that is, a fixed value of order of priority for assigning an execution right in TSS, and "TSS suspended degree" indicating a value used for calculating TSS priority, that is, a degree that a TSS task has not been brought into the activation-completed state in each TS.

In the "TSS priority" and the "TSS fixed priority", a larger value indicates a higher order of priority. The "TSS priority" is calculated through addition of the "TSS fixed priority" and the "TSS suspended degree".

When a TSS task is activated in each TS over its in-1TS activation time, the "TSS suspended degree" decreases, and when not activated over its in-1TS activation time, the "TSS suspended degree" increases. Accordingly, when a TSS task is activated over its in-1TS activation time, the "TSS priority" decreases and thus the order of priority is lowered. When the task is not activated over its in-1TS activation time, the "TSS priority" increases and thus the order of priority is raised. The details will be described later.

Figure 4:
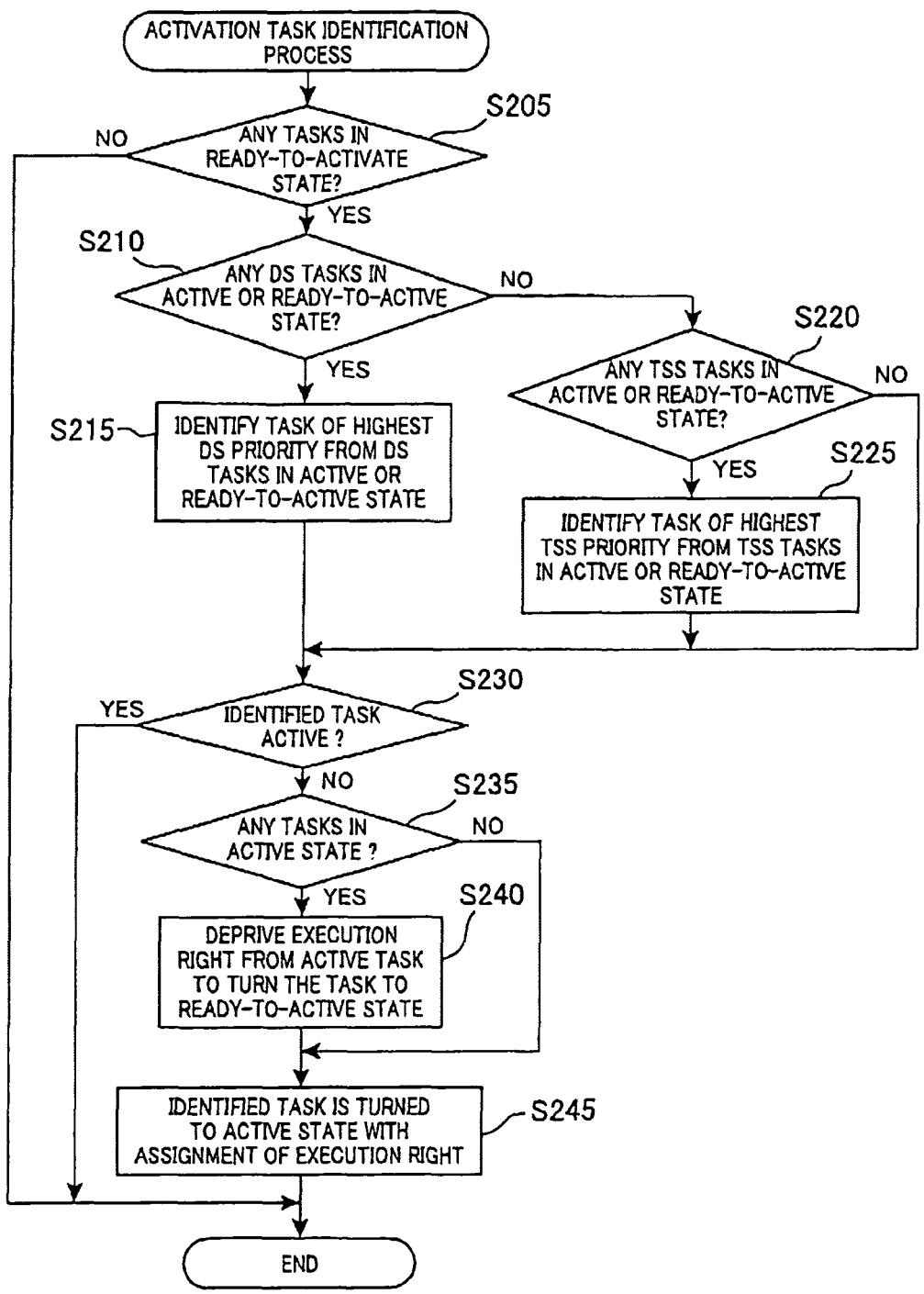
FIG. 4 is a flow diagram illustrating an activation task identification process according to the first embodiment.

Referring to FIG. 4, hereinafter is described an activation task identification process that is a sub-routine for determining a task to which an execution right is assigned. FIG. 4 is a flow diagram illustrating the activation task identification process. The present process is performed by the scheduling section 61. The present process is called up when, for example, the reference cycle arrives (i.e. when a new TS is started) or when a task is brought into an activation-completed state or an event-waiting state.

The description hereinafter will be provided from a viewpoint that what process is performed in each of the components configuring the scheduling section 61. Just to make certain, each process is realized when the CPU 110 of the on-vehicle equipment 100 executes each component that is a program.

First, at step S205, the task management table is referred to by the scheduler setter 61b of the scheduling section 61 to determine the presence of tasks in a ready-to-activate state. If a task in a ready-to-activate state is present (Yes at step S205), control proceeds to step S210. If no task is in a ready-to-activate state (No at step S205), the present process is ended.

At step S210, the task management table is referred to by the scheduler setter 61b to determine the presence of any tasks in an active state or ready-to-activate state, from among the DS tasks. Then, if an affirmative determination is made (Yes at step S210), control proceeds to step S215. If a negative determination is made (No at step S210), control proceeds to step S220.

At step S215, the task management table is referred to by the scheduler setter 61b to identify a task having the highest priority (i.e. having a minimum value in the item "DS priority") from among the DS tasks in an active state or ready-to-activate state. Then, control proceeds to step S230.

At step S220, the task management table is referred to by the scheduler setter 61b to determine the presence of any tasks in an active state or ready-to-activate state from among the TSS tasks. If an affirmative determination is made (Yes at step S220), control proceeds to step S252. If a negative determination is made (No at step S220), control proceeds to step S230.

At step S225, the task management table is referred to by the scheduler setter 61b to identify a task having the highest priority (i.e. having a maximum value in the item "TSS priority") from among the TSS tasks in an active state or ready-to-activate state. Then, control proceeds to step S230.

At step S230, the task management table is referred to by the scheduler setter 61b to determine whether or not the task identified at step S215 or S225 is in an active state. If an affirmative determination is made (Yes at step S230), the present process is ended. If a negative determination is made (No at step S230), control proceeds to step S235.

At step S235, the task management table is referred to by the scheduler setter 61b to determine the presence of any tasks in an active state. Then, if any tasks in an active state are present (Yes at step S235), control proceeds to step S240. If no task is in an active state (No at step S235), control proceeds to step S245.

At step S240, each of the tasks in an active state is deprived of the execution right by the scheduler setter 61b to thereby end the activation of the tasks. Also, the item "activation state" of the tasks in the task management table is updated to the ready-to-activate state by the scheduler setter 61b.

At step S245, the scheduler setter 61b assigns an execution right to the task identified at step S215 or S225. Thereafter, the activation of the task is started by the scheduler executer 61c. Also, the item "activation state" of the task in the task management table is updated to the active state by the scheduler setter 61b. Then, the present process is ended.

Figure 5A:
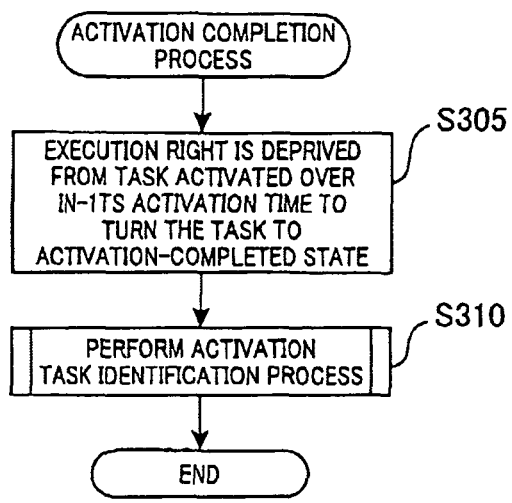
FIGS. 5A to 5D are flow diagrams illustrating an activation completion process, an abandonment process, an event-waiting process and an event generation process, respectively, according to the first embodiment.

Referring now to FIG. 5A, hereinafter is described an activation completion process. FIG. 5A is a flow diagram illustrating the activation completion process. In the activation completion process, the tasks whose operation time has expired the in-1TS activation time are sequentially deprived of the execution right, while the execution rights are newly assigned to other tasks. The present process is performed when the operation time of a task in each TS has reached its in-1TS activation time.

At Step S305, the task that has been assigned with an execution right is deprived of the execution right by the scheduler setter 61b to end the activation of the task. Then, the item "activation state" of the task in the task management table is updated to an activation-completed state. Then, control proceeds to step S310.

At step S310, the activation task identification process is called up to newly assign an execution right to a task in a ready-to-activate state. Then, when the activation task identification process is ended, the present process is ended.

Figure 5B:
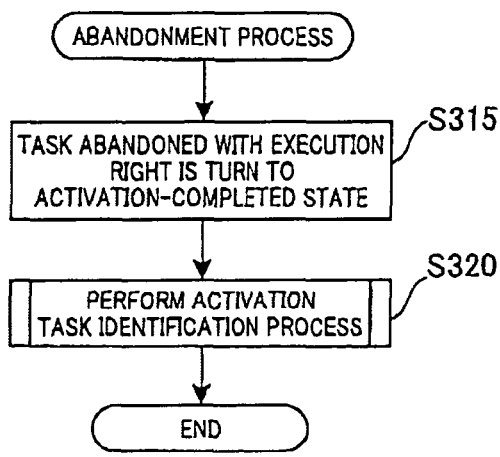

Referring to FIG. 5B, an abandonment process is explained. FIG. 5B is a flow diagram illustrating the abandonment process. In the abandonment process, when a task has voluntarily abandoned its execution right, an execution right is newly assigned to a different task.

The present process is performed when abandonment conditions are met in an active task, and the task state receiver 61a of the scheduling section 61 has been notified from the task of the voluntary abandonment of its execution right.

At step S315, the scheduler setter 61b updates the item "activation state" of the task management table to an activation-completed state, for the task that has abandoned its execution right. Then, control proceeds to step S320.

At step S320, the activation task identification process is called up to newly assign an execution right to a task in a ready-to-activate state. Then, when the activation task identification process is ended, the present process is ended.

Figure 5C:
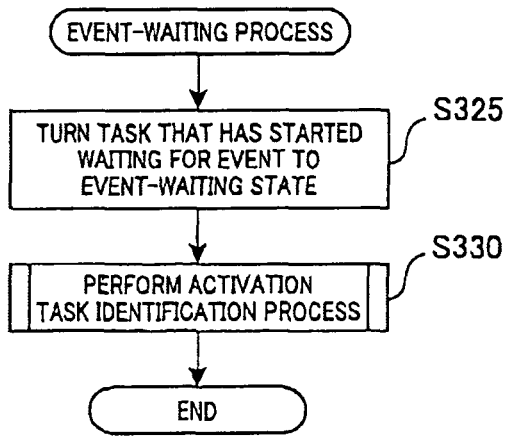

Referring to FIG. 5C, an event-waiting process is explained. FIG. 5C is a flow diagram illustrating the event-waiting process. In the event-waiting process, a task that has started waiting for an event is removed from objects to be assigned with an execution right, and an execution right is newly assigned to a different task. The present process is performed when event-waiting conditions are met in an active task, and the task state receiver 61a has been notified from the task of the start of waiting for generation of an event.

At step S325, the scheduler setter 61b updates the item "activation state" of the task management table to an event-waiting state, for a task that has abandoned an execution right and started waiting for generation of an event. Then, control proceeds to step S330.

At step S330, the activation task identification process is called up to newly assign an execution right to a task in a ready-to-activate state. Then, when the activation task identification process is ended, the present process is ended.

Figure 5D:
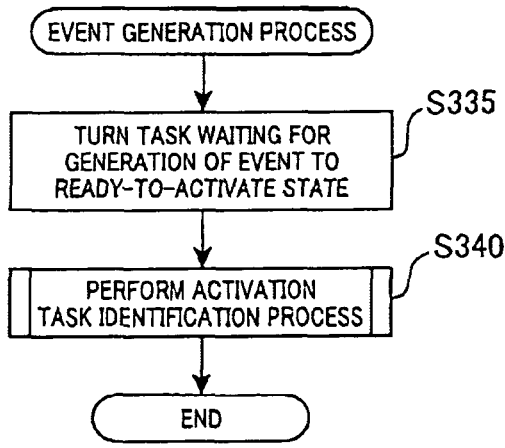

Referring to FIG. 5D, an event generation process is explained. FIG. 5D is a flow diagram illustrating the event generation process. In the event generation process, when a predetermined event is generated, the task waiting for generation of the event is reinstated as an object to be assigned with an execution right. The present process is performed when generation of an event has been detected, which event is suitable for a task in the event-waiting state.

At step S335, the scheduler setter 61b updates the item "activation state" of the task management table to a ready-to-activate state, for the task waiting for generation of an event. Then, control proceeds to step S340.

At step S340, the activation task identification process is called up. Meanwhile, the activation of an active task is continued as it is, or an execution right is newly assigned to a task that has been brought into a ready-to-activate state with the generation of an event. Then, when the activation task identification process is ended, the present process is ended.

Figure 6:
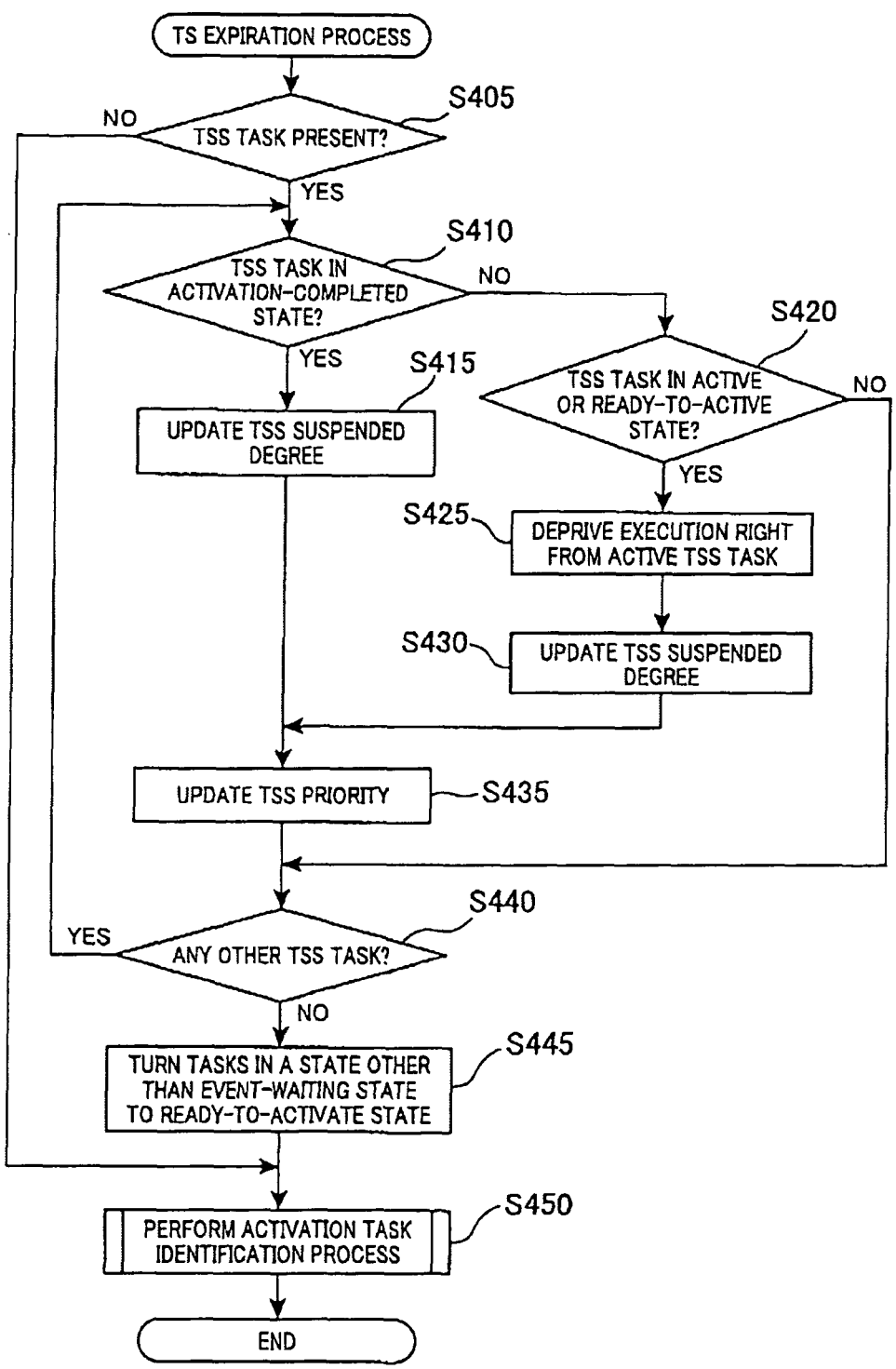
FIG. 6 is a flow diagram illustrating a time slice (TS) expiration process according to the first embodiment.

Referring to FIG. 6, hereinafter is described a TS expiration process. FIG. 6 is a flow diagram illustrating the TS expiration process. In the TS expiration process, a task assigned with an execution right is deprived of the execution right when a new TS is started, while an execution right is newly assigned to a DS task. The present process is performed when a new TS is started.

At step S405, the scheduler setter 61b refers to the task management table to determine the presence of TSS tasks. When TSS tasks are present (Yes at step S405), control proceeds to step S410. In the absence of TSS tasks (No at step S405), control proceeds to step S450.

At step S410, the scheduler setter 61b refers to the task management table to select a headmost TSS task from among the TSS tasks registered at the task management table. Then, it is determined whether or not the item "activation state" of the selected task is defined to be an activation-completed state. If an affirmative determination is made (Yes at step S410), control proceeds to step S415. If a negative determination is made (No at step S410), control proceeds to step S420.

At step S415, the scheduler setter 61b reduces the degree set in the "TSS suspended degree" of the selected task in the task management table. Specifically, a new TSS suspended degree is calculated from the following formula to set the calculated value in the item "TSS suspended degree" of the task management table.

New $TSS$ suspended degree=$TSS$ suspended degree before update$\times(9/10)$

Upon update of the TSS suspended degree, control proceeds to step S435.

At step S420, the scheduler setter 61b refers to the task management table to determine whether or not the "activation state" of the selected TSS task is defined to be an active state or to be a ready-to-activate state. If an affirmative determination is made (Yes at step S420), control proceeds to step S425. If a negative determination is made (No at step S420), control proceeds to step S440.

At step S425, the selected TSS task, if it is in an active state, is deprived of its execution right by the scheduler setter 61b to thereby end the activation of the selected task. In this case, the scheduler setter 61b accesses the task management table to define the item "activation state" of the selected TSS task to be an activation-completed state. Then, control proceeds to step S430.

At step S430, the scheduler setter 61b increases the degree set in the "TSS suspended degree" of the selected task in the task management table. Specifically, a new TSS suspended degree is calculated from the following formula to set the calculated value in the "TSS suspended degree" of the task management table.

New TSS suspended degree=TSS suspended degree before update×(9/10)+5

Upon update of the TSS suspended degree, control proceeds to step S435.

At step S435, the scheduler setter 61b updates the "TSS priority" of the selected task in the task management table. Specifically, a sum of a value indicated at the "TSS fixed priority" and a value indicated at the "TSS suspended degree" of the selected task is calculated to set the calculated value in the "TSS priority". Then, control proceeds to step S440.

At step S440, the scheduler setter 61b determines the presence/absence of any TSS tasks whose "TSS priority" has not been updated. If it is determined that TSS tasks whose "TSS priority" has not been updated are present (Yes at step S440), a head most TSS task of the TSS tasks registered in the task management table is newly selected. Then, control returns to step S410. In the absence of such tasks (No at step S440), control proceeds to step S445.

At step S445, the scheduler setter 61b defines the "activation state" of the task management table for the tasks which are not in an event-waiting state, to be a ready-to-activate state. Then, control proceeds to step S450.

At step S450, the activation task identification process is called. Of the DS tasks, the one having the highest priority is assigned with an execution right. Then, when the activation task identification process is ended, the present process is ended.

Figure 7:
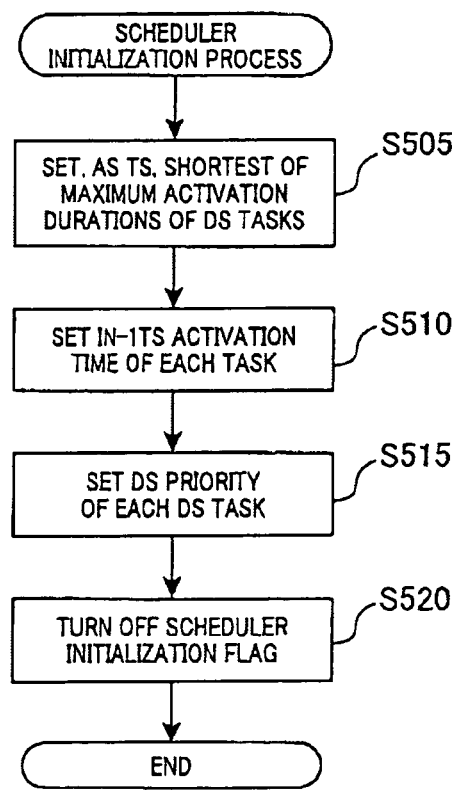
FIG. 7 is a flow diagram illustrating a scheduler initialization process according to the first embodiment.

Referring to FIG. 7, a scheduler initialization process is explained. FIG. 7 is a flow diagram illustrating the scheduler initialization process. In the scheduler initialization process, the "in-1TS activation time", for example, of the task management table is defined. The present process is performed by the scheduler setter 61b when the control program 1 is started or when a task to be activated is added or deleted.

When the present process is performed at the start of the control program 1, the task management table should be in a state where records of the tasks to be scheduled have been registered, with the "name" and the "type" being defined. In this case, regarding those records which correspond to the DS tasks, the "maximum activation duration" and the "required activation time" have been defined. Also, regarding those records which correspond to the TSS tasks, the "TSS priority", the "TSS fixed priority" and the "TSS suspended degree" have been defined.

At step S505, the scheduler setter 61b refers to the task management table to identify the shortest one of the maximum activation durations recorded at the item "maximum activation duration" of the DS tasks. The scheduler setter 61b then determines the identified shortest maximum activation duration as being a TS, and then control proceeds to step S510.

At step S510, the scheduler setter 61b calculates, as set forth below, an in-1TS activation time of each task registered in the task management table.

Specifically, regarding the DS tasks, the following formula is used to calculate the in-1TS activation time:

In-1TS activation time=(required activation time/maximum activation duration)×TS It should be appreciated that a predetermined margin may be added to the (required activation time/maximum activation duration)×TS to provide the resultant value as the in-1TS activation time.

Regarding the TSS tasks, a predetermined fixed time (e.g., 0.1 ms) may uniformly be used as the in-1TS activation time. Alternatively, an individually set fixed time for each of the TSS tasks may be used as the in-1TS activation time. In this case, the fixed time may be specified based on the binary data configuring each task.

Then, the in-1TS activation time of each task is set in the item "in-1TS activation time" of the task management table, and then control proceeds to step S515.

At step S515, regarding the DS tasks, the scheduler setter 61b defines the "DS priority" of the task management table. Specifically, the "DS priority" is defined according to the following rules.

(a) Of DS tasks, tasks in ascending order of maximum activation duration are sequentially set with priorities in descending order.

(b) If the tasks have the same maximum activation duration, tasks in descending order of required activation time are sequentially set with priorities in descending order.

(c) If the tasks have the same maximum activation duration and the same required activation time, tasks starting from the task corresponding to the headmost record in the task management table are sequentially set with priorities in descending order.

When the "DS priority" definition is finished, control proceeds to step S520.

At step S520, the scheduler setter 61b turns off a scheduler initialization flag to end the present process.

Figure 8A:
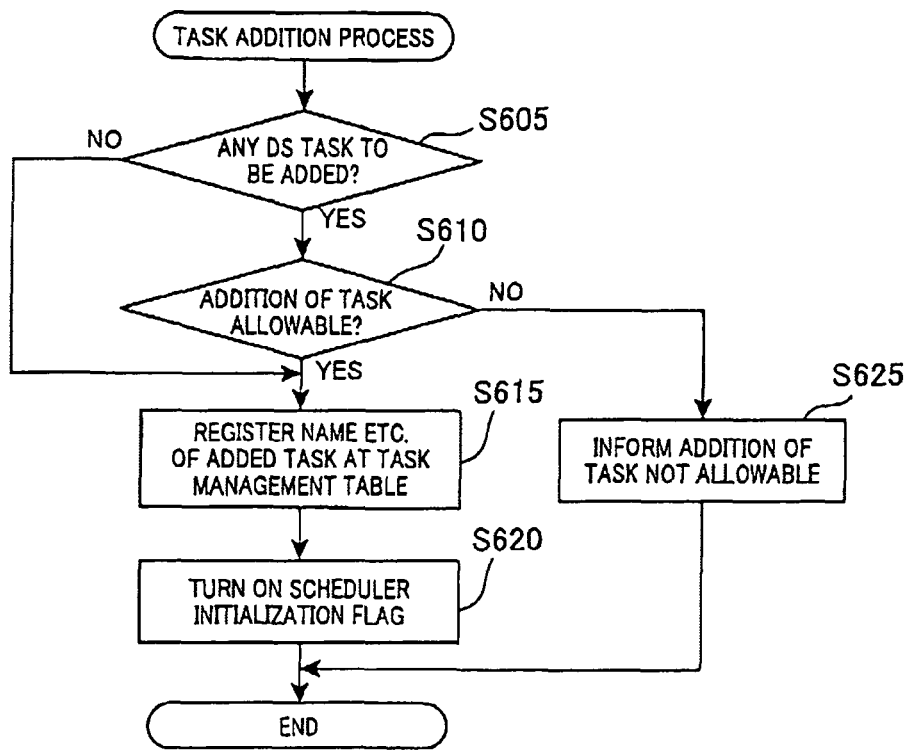
FIGS. 8A to 8C are flow diagrams illustrating a task addition process, a task deletion process and a periodical revision process, respectively, according to the first embodiment.

Referring now to FIG. 8A, a task addition process is explained. FIG. 8A is a flow diagram illustrating the task addition process. In the task addition process, tasks to be scheduled are newly added. The present process is performed by the task addition/deletion receiver 61d when, for example, a user has requested the addition of a task stored in the memory of the on-vehicle equipment 100 or when a new task has been downloaded as already mentioned above.

At step S605, the task addition/deletion receiver 61d determines whether or not a task to be added is a DS task. If an affirmative determination is made (Yes at step S605), control proceeds to step S610. If a negative determination is made (No at step S605), control proceeds to step S615.

At step S610, the task addition/deletion receiver 61d determines whether or not the addition of a new DS task is allowable. If an affirmative determination is made (Yes at step S610), control proceeds to step S615. If a negative determination is made (No at step S610), control proceeds to step S625.

Specifically, the addition of a new DS task is determined based on the proportion of the time required for the DS in each TS in the case where the new DS task has been added. More specifically, the task addition/deletion receiver 61d refers to the task management table to identify the "maximum activation duration" and the "required activation time" of each of the current DS tasks. At the same time, the task addition/deletion receiver 61d identifies the "maximum activation duration" and the "required activation time" of the new DS task to be added based on the binary data configuring the new DS task to be added. Then, for each of these tasks (i.e. the current DS tasks and the new DS task to be added), the required activation time is divided by the maximum activation duration, followed by calculating the sum of the divided values. If the sum is less than a predetermined value (e.g., "1"), the addition of the task in question may be determined to be allowable. If the sum is equal to or more than the predetermined value, the addition of the task in question may be determined not to be allowable.

At step S615, the task addition/deletion receiver 61d adds a record at the end of the task management table, which record corresponds to the task to be newly added, and also defines each of the items for the newly added task. Then, control proceeds to step S620.

Specifically, the task addition/deletion receiver 61d identifies the name and the type, as well as the mode of scheduling (DS or TSS), of the task in question based on the binary data configuring the task to set the identified data as the "name" and the "type" for the added record. If the added task is a DS task, a maximum activation duration and a required activation time are identified based on the binary data to set the identified data as the "maximum activation duration" and the "required activation time" for the added record. On the other hand, if the added task is a TSS task, a TSS fixed priority is identified based on the binary data to set the identified data as the "TSS fixed priority" for the added record. Also, the task addition/deletion receiver 61d sets the "TSS suspended degree" of the record to "0" and sets the "TSS priority" to the value of the "TSS fixed priority".

At step S620, the task addition/deletion receiver 61d turns on the scheduler initialization flag to thereby end the present process. At step S625 to which control proceeds if the addition of a task is not allowable, the task addition/deletion receiver 61d provides a notification, via a display, not shown, that the addition of a task is not allowable to thereby end the present process.

Figure 8B:
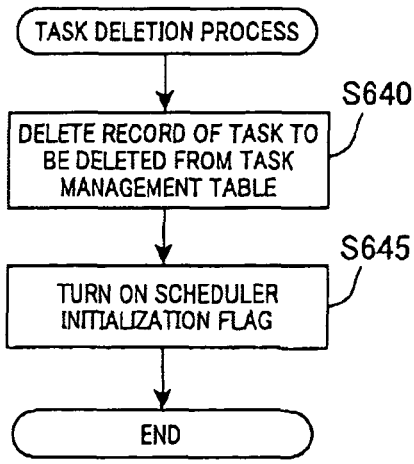

Referring to FIG. 8B, a task deletion process is explained. FIG. 8B is a flow diagram illustrating the task deletion process. In the task deletion process, tasks are deleted from the objects to be scheduled. The present process is performed, for example, by the task addition/deletion receiver 61d in response to a signal or the like issued by a user's operation or issued from an external unit.

At step S640, the task addition/deletion receiver 61d deletes those records which correspond to the tasks to be deleted from the objects to be scheduled, and then control proceeds to step S645.

At step S645, the task addition/deletion receiver 61d turns on the scheduler initialization flag to thereby end the present process.

Figure 8C:
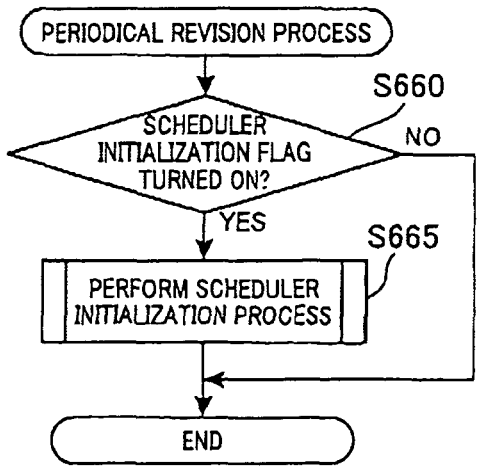

Referring to FIG. 8C, a periodical revision process is explained. FIG. 8C is a flow diagram illustrating the periodical revision process. In the periodical revision process, the task management table is revised. The present process is performed by the scheduler setter 61b at the arrival of the timing of the reference cycle.

At step S660, the scheduler setter 61b determines whether or not the scheduler initialization flag has been turned on. If an affirmative determination is made (Yes at step S660), control proceeds to step S665. If a negative determination is made (No at step S660), the present process is ended.

At step S665, the scheduler setter 61b calls up the scheduler initialization process as a sub-routine. After ending the scheduler initialization process, the present process is ended.

Hereinafter is explained a specific example in which the A to E tasks are scheduled by the scheduling section 61.

First, referring to FIG. 9 and FIGS. 10A to 10D, activations of the A to D task are explained, covering the period from when the B task has transitioned into an event-waiting state up to when the B task is assigned with an execution right with the generation of an event.

FIG. 9 is a timing diagram illustrating activation times of the A to E tasks. FIGS. 10A to 10D each illustrate the task management table. In the present explanation, the TS is set to 1 ms.

As shown in each of the task management tables of FIGS. 10A to 10D, the operation times in 1TS of the A to E task are set to "0.1 ms", "0.3 ms", "0.2 ms", "0.2 ms" and "0.1 ms", respectively, with the sum of the operation times being less than the TS (1 ms). Therefore, each of the A to E tasks activates over the in-1TS activation time in each TS. As shown in FIG. 10A, at the start of a first cycle, i.e. a first TS, the DS priorities of the A to C tasks are set to "1", "2" and "3", respectively, while the TSS priorities of the D and E tasks are set to "20" and "0", respectively. Thus, in the first cycle, the tasks each activate over the in-1TS activation time in the order of the A to E tasks (see FIG. 9).

In a subsequent second cycle, after being assigned with an execution right and after the expiration of 0.2 ms, the B task abandons its execution right and transitions into an event-waiting state because the event-waiting conditions of the B task are met. At the same time, the C task is started to be activated (see FIG. 9). FIG. 10B shows the task management table immediately after transition of the B task into an event-waiting state.

In a third cycle, no execution right is assigned to the B task in the event-waiting state, while the A and C to E tasks are activated in this order over the respective in-1T activation times (see FIG. 9). FIG. 10C shows the task management table at the start of the third cycle.

In a fourth cycle, while the C task is active, an event which the B task has waited for is generated (see FIG. 9). In this case, the execution right is transferred from the C task to the B task so that the B task transitions into an active state. At the same time, the C task that has not been fully active over the in-1TS activation time, transitions into a ready-to-activate state. FIG. 10D shows the task management table immediately after the start of the activation of the B task upon generation of the event. When the operation time of the B task has reached its in-1TS activation time, the execution right is transferred to the C task. When the operation time of the C task has reached its in-1TS activation time, totaled with the operation time before the generation of the event, the C task transitions into an activation-completed state. After that, an execution right is assigned to the D and E tasks in this order.

In this specific example, the execution right has been transferred from the C task to the B task, because the event has been generated during the activation of the C task whose priority is lower than that of the B task. However, if an event has been generated during the activation of the A task having a higher priority than the B task, the B task transitions into a ready-to-activate state. Then, when the activation of the A task has been completed, the B task is assigned with an execution right.

Similarly, if an event has been generated while the D or E task, i.e. TSS task, is active, the execution right is transferred to the B task. Then, when the activation of the B task has been completed, the execution right is transferred to the task that has been active at the time of generation of the event.

Referring to FIG. 11, the activations of the A to E tasks are explained, taking the case as an example where the B task abandons the execution right. FIG. 11 is a timing diagram illustrating this case. It should be appreciated that the A to E tasks here are scheduled based on the task management table of FIG. 10A.

In a first cycle, when the B task abandons its execution right with the abandonment conditions being met, the execution right is transferred from the B task to the C task. Then, the B task, although the operation time has not reached its in-1TS activation time, transitions into an activation-completed state. Then, on or after a second cycle, the A to E tasks are activated in this order over the respective in-1TS activation times.

Referring now to FIG. 12 and FIGS. 13A to 13D, hereinafter are explained the activations of the A to E tasks, taking the case as an example where the sum of the in-1TS activation times of the A to E tasks exceeds the TS. FIG. 12 illustrates a timing diagram and FIGS. 13A to 13D each illustrate the task management table in this case. As shown in each of the task management tables shown in FIGS. 13A to 13D, the in-1TS activation times of the A to E tasks are set to "0.2 ms", "0.3 ms", "0.3 ms", "0.2 ms" and "0.1 ms", respectively, with a TS being set to 1 ms and the sum of the in-1TS activation times exceeding the TS. Accordingly, the D and E tasks, i.e. the TSS tasks, are scheduled during the vacant time of "0.2 ms" from the end of the DS up to the arrival of the subsequent TS. For this reason, the D and E tasks are not necessarily fully activated over the in-1TS activation time in each TS.

A first cycle is explained. As shown in the task management table of FIG. 13A, at the start of the first cycle, the "TSS priority" of the D and E tasks is set to "20" and "0", respectively. Accordingly, after completing the activations of the A to C tasks, i.e. DS tasks, the D task is activated over its in-1S activation time, but the E task is not assigned with an execution right (see FIG. 12).

As a result, as shown in the task management table of FIG. 13B, the "TSS suspended degree" of the E task at the start of the second cycle increases to "5", while the "TSS priority" becomes "5". On the other hand, the "TSS suspended degree" of the D task that has been activated over the in-1TS activation time in the first cycle remains "0", with the "TSS priority" thereof remaining "20". Thus, the D task having a higher priority than the E task is again assigned with an execution right over the in-1TS activation time in the second cycle, but the E task is still not assigned with an execution right (see FIG. 12).

Thereafter, the E task will not be activated until the "TSS priority" of the E task exceeds that of the D task. At the start of the TS's on or after the second cycle, the "TSS priority" of the E task increases in the order of "10", "14", "18" and "21" and finally exceeds "20" at the start of a sixth cycle. On the other hand, the "TSS priority" of the D task remains unchanged at "20" on or after the second cycle as well. Accordingly, as shown in FIG. 13C, the "TSS priority" of the E task exceeds that of the D task for the first time at the start of the sixth cycle. Thus, in the sixth cycle, the E task is activated over its in-1TS activation time, which is followed by the activation of the D task.

As shown in FIG. 13D, the "TSS priority" of the D task increases to "25" at the start of a seventh cycle, while the "TSS priority" of the E task decreases to "19". For this reason, in the seventh cycle, the D task is assigned with an execution right effective over its in-1TS activation time, but the E task is not assigned with an execution right.

Thereafter, every time a new TS arrives, the "TSS priority" of the D and E tasks is increased or decreased. Thus, in performing TSS in each TS, an execution right is sequentially assigned to these tasks in descending order of the values indicated at the "TSS priority".

Referring to FIGS. 14A-1, 14A-2 and 14B, activation timing of each task is explained, taking the case as an example where the A task to be scheduled is added or deleted. FIGS. 14A-1 and 14A-2 each illustrate the task management table in this case. FIG. 14B is a timing diagram illustrating this case.

Let us assume that the B to E tasks are initially subjected to scheduling and, accordingly, that the B to E tasks are registered at the task management table (see FIG. 14A-1). In this case, a TS is set to "2 ms" that corresponds to the maximum activation duration of the B task. Also, the "in-1TS activation time" of the B to E tasks is set to "0.6 ms", "0.4 ms", "0.2 ms" and "0.1 ms", respectively. The B to E tasks are each activated at the timing of a first cycle and a second cycle shown in the timing diagram of FIG. 14B.

Let us further assume that the addition of the A task, i.e. a DS task, has been requested, that the task addition process has been executed, and that the record corresponding to the A task has been added at the end of the task management table. In this case, the scheduler initialization process is executed when the second cycle has finished to thereby update the task management table as shown in FIG. 14A-2. In this update, a TS is set to "1 ms" which is the maximum activation duration of the A task. Also, the "in-1TS activation time" of the B to E tasks and the A task is set to "0.3 ms", "0.2 ms", "0.2 ms", "0.1 ms" and "0.1 ms", respectively, while the "DS priority" of the B, C and A tasks is set to "2", "3" and "1", respectively. Thus, the A to E tasks are each activated at the timing of a third cycle and a fourth cycle shown in the timing diagram of FIG. 14B.

Further, let us assume that the deletion of the A task has been requested in the fourth cycle, and that the task deletion process has been executed. In this case, the scheduler initialization process is executed when the fourth cycle has been finished. As a result, the record corresponding to the A task is deleted from the task management table to again update the task management table as shown in FIG. 14A-1 (with a TS being set to "2 ms" which is the maximum activation duration of the B task). Then, the B to E tasks are each activated at the timing of a fifth cycle shown in the timing diagram of FIG. 14B.

According to the scheduling section 61 of the control management unit 60 in the control program 1 of the first embodiment, the A to C tasks, i.e. DS tasks, are activated without fail over the respective in-1TS activation times in each TS, so that the operation time of each of these tasks per predetermined period is guaranteed. Further, the D and E tasks, i.e. TSS tasks, are sequentially assigned with an execution right during the period from the full completion of all of the activations of the A to C tasks up to the arrival of the subsequent reference cycle. Accordingly, while the A to E tasks are activated in parallel, the real-time performance of the A to C tasks is ensured.

[Second Embodiment]

Figures 15A, 15B:
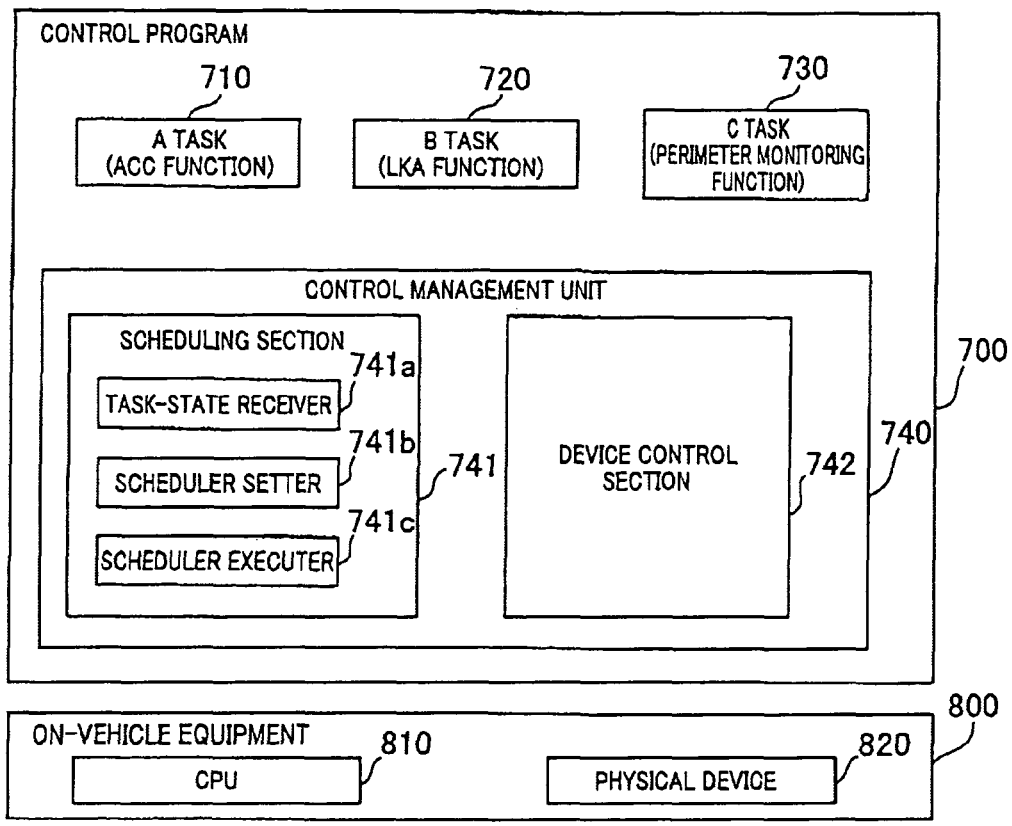
FIG. 15A is a block diagram illustrating the configuration of on-vehicle equipment and the configuration of a control program, according to a second embodiment of the present invention.
FIG. 15B illustrates a task management table according to the second embodiment.

With reference to FIGS. 15A and 15B as well as FIGS. 16 to 18, hereinafter is described on-vehicle equipment according to a second embodiment of the present invention.

On-vehicle equipment 800 of the second embodiment has an ACC (adaptive cruise control) function and an LKA (lane keeping assist) function and a perimeter monitoring function, which are similar to those of the first embodiment. FIG. 15A is a block diagram illustrating the configuration of the on-vehicle equipment 800 configured similarly to the first embodiment and the configuration of a control program 700 installed in the on-vehicle equipment 800 and executed by a CPU 810.

The control program 700 is stored in a memory (not shown) configured by a device not requiring a memory holding action, such as a flash memory, in a physical device 820.

The control program 700 includes an A task 710, a B task 720 and a C task 730, which are similar to those in the first embodiment, as well as a control management unit 740 for running the A to C tasks 710 to 730. Similar to the first embodiment, the A to C tasks 710 to 730 may each be configured as a virtual machine, or as a program consisting of a single process unit for realizing a corresponding function or as a program consisting of a plurality of process units (i.e. a plurality of threads).

The control management unit 740 includes a scheduling section 741 and a device control section 742. The scheduling section 741 sequentially assigns an execution right to the A to C tasks 710 to 730 to schedule these tasks. The device control section 742 is configured similarly to the first embodiment.

The scheduling section 741 includes a task addition/deletion receiver 741a, a scheduler setter 741b and a scheduler executer 741c. The task addition/deletion receiver 741a adds or deletes tasks to be scheduled. The scheduler setter 741b assigns an execution right to each of the tasks. The scheduler executer 741c activates the tasks each assigned with an execution right.

When an execution right is assigned to a task configured as a virtual machine mentioned above, threads are scheduled by an OS in the virtual machine to run the threads in parallel. When a task configured by a plurality of threads is assigned with an execution right as well, the threads are similarly scheduled in the task by an OS.

The scheduler setter 741b of the scheduling section 741 sets a reference cycle by producing periodically arriving timing. The scheduler setter 741b also sequentially assigns an execution right to the A to C tasks 710 to 730 in a time slice (TS) that is one period of the reference cycle, based on the task management table, which will be described later, to thereby activate these tasks in parallel.

The task management table mentioned above is explained. FIG. 15B illustrates an example of the task management table. The task management table is possessed by the scheduler setter 741b of the scheduling section 741.

Similar to the task management table of the first embodiment, the task management table of the second embodiment includes an item of "name" for indicating the name of each task, items of "maximum activation duration", "required activation time" and "in-1TS activation time" which indicate the maximum activation duration, the required activation time and the in-1TS activation time, respectively, similar to those of the first embodiment. In addition to these items, the task management table includes an item "priority" for indicating order of priority in assigning an execution right to each of the tasks.

Hereinafter is explained scheduling of tasks registered at the task management table.

The scheduler setter 741b determines, as the TS, the shortest one of the maximum activation durations of the tasks registered at the task management table. At the same time, the scheduler setter 741b calculates an in-1TS activation time for each of the tasks, based on the maximum activation duration and the required activation time (this will be specifically described later) and records the calculated value in the task management table. Then, the scheduler setter 741b sequentially assigns an execution right to the tasks, which is effective over the in-1TS activation time of each task, in descending order of priority of s the tasks to thereby schedule the tasks.

Figure 16:
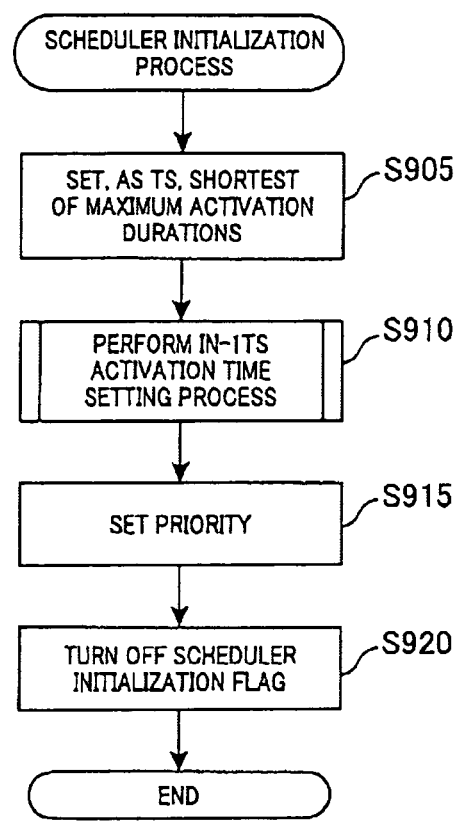
FIG. 16 is a flow diagram illustrating a scheduler initialization process according to the second embodiment.

Referring to FIG. 16, hereinafter is described a scheduler initialization process. FIG. 16 is a flow diagram illustrating the scheduler initialization process. The scheduler initialization process is used for determining a time slice TS as well as such items as the "in-1TS activation time" of the task management table, which are used in assigning an execution right to each task. The present process is performed by the scheduler setter 741b when the control program 700 is started or when tasks to be scheduled have been added or deleted.

When the present process is performed at the time of starting the control program 700, the task management table should be in a state where the records of the tasks to be scheduled are registered, with the "name", "maximum activation duration" and "required activation time" being defined.

At step S905, the scheduler setter 741b refers to the task management table to determine, as the TS, the shortest of the maximum activation durations. Then control proceeds to step S910.

At step S910, the scheduler setter 741b calls up an in-1TS activation time setting process (which will be described later) that is a sub-routine to calculate an in-1TS activation time for each of the tasks registered at the task management table. Then, control proceeds to step S915.

At step S915, the scheduler setter 741b defines the "priority" of the task management table. Specifically, the "priority" is defined according to the rules set forth below.

(a) Tasks in ascending order of maximum activation duration are sequentially set with priorities in descending order.

(b) If the tasks have the same maximum activation duration, tasks in descending order of required activation time are sequentially set with priorities in descending order.

(c) If the tasks have the same maximum activation duration and the same required activation time, tasks starting from the task corresponding to the headmost record in the task management table are sequentially set with priorities in descending order.

After finishing the definition of the "priority", control proceeds to step S920. At step S920, the scheduler setter 741b turns off a scheduler initialization flag to end the present process.

Figure 17:
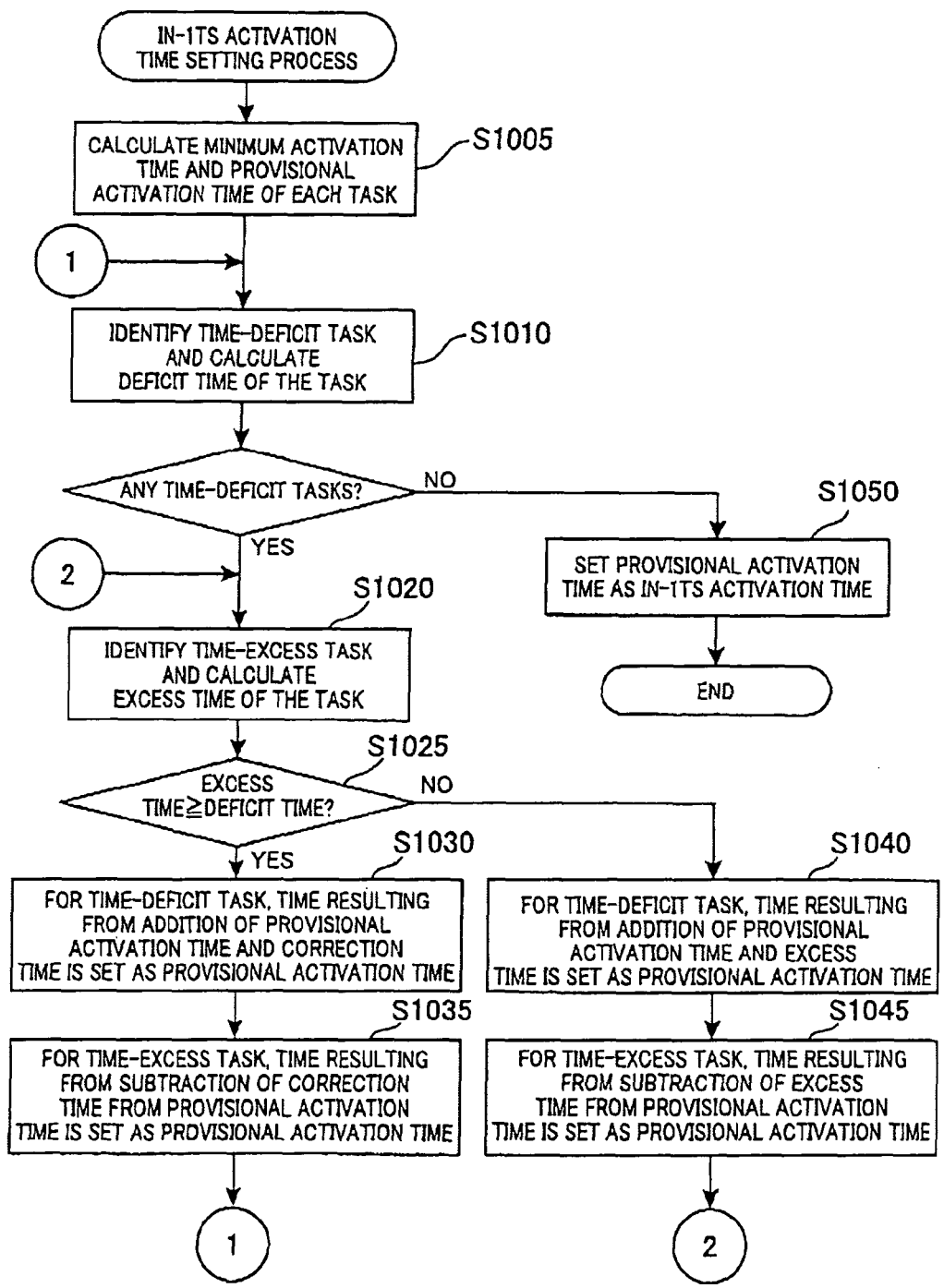
FIG. 17 is a flow diagram illustrating an in-1TS activation time setting process according to the second embodiment.

Referring to FIG. 17, hereinafter is explained an in-1TS activation time setting process. FIG. 17 is a flow diagram illustrating the in-1TS activation time setting process. This process is a sub-routine for determining an in-1TS activation time for each of the tasks.

At step S1005, the scheduler setter 741b uses the following formula to calculate a minimum activation time of each of the tasks registered at the task management table.

Minimum activation time=(required activation time/ maximum activation duration)×$TS$ Also, the scheduler setter 741b calculates a provisional activation time for each of the tasks registered at the task management table, using the following formula.

Provisional activation time=(maximum activation duration/sum of maximum activation durations in the tasks registered at the task management table)×$TS$ In this case, for example, a time corresponding to approximately a couple tenths of the TS may be set as a margin. Then, the maximum activation duration may be divided by the time resulting from the addition of the above sum of the maximum activation durations and the margin.

Then, control proceeds to step S1010. At step 1010, the scheduler setter 741b determines the tasks each having a provisional activation time shorter than the minimum activation time, as being time-deficit tasks. Then, the scheduler setter 741b identifies a time-deficit task corresponding to the headmost record, from among the time-deficit tasks registered at the task management table. Then, for the identified time-deficit task, the scheduler setter 741b calculates a difference, i.e. a deficit time, between the provisional time and the minimum activation time. Then, control proceeds to step S1015.

At step S1015, the scheduler setter 741b determines whether or not a time-deficit task has been identified at step S1010. If an affirmative determination is made (Yes at step S1015), control proceeds to step S1020. If a negative determination is made (No at step S1015), control proceeds to step S1050.

At step S1020, the scheduler setter 741b determines the tasks each having a provisional activation time longer than the minimum activation time, as being time-excess tasks. Then, the scheduler setter 741b identifies a time-excess task corresponding to the headmost record, from among the time-excess tasks registered at the task management table. Then, for the identified time-excess task, the scheduler setter 741b calculates a difference, i.e. an excess time, between the provisional time and the minimum activation time. Then, control proceeds to step S1025.

At step S1025, the scheduler setter 741b compares the length of the deficit time of the time-deficit task identified at step S1010, with the length of the excess time of the time-excess task identified at step S1020. If the excess time is equal to or more than the deficit time (Yes at step S1025), control proceeds to step S1030. If the excess time is less than the deficit time (No at step S1025), control proceeds to step S1040.

At step S1030, for the time-deficit task identified at step S1010, the scheduler setter 741b treats the deficit time as being a correction time and adds the correction time to the provisional activation time to newly set the resultant time as a provisional activation time. In this case, if the excess time of the time-excess task identified at step S1020 exceeds the deficit time, a time equal to or more than the deficit time and equal to or less than the excess time may be used as the correction time. Then, control proceeds to step S1035.

At step S1035, for the time-excess task identified at step S1020, the scheduler setter 741b subtracts the correction time set at step S1030 from the provisional time to newly set the resultant time as a provisional activation time. Then, control returns to step S1010.

At step S1040, for the time-deficit task identified at step S1010, the scheduler setter 741b treats the excess time of the time-excess task identified at step S1020 as being a correction time and adds the correction time to the provisional activation time to newly set the resultant time as a provisional activation time. Then, control proceeds to step S1045.

At step S1045, for the excess task identified at step S1020, the scheduler setter 741b subtracts the correction time set at step S1040 from the provisional time to newly set the resultant time as a provisional activation time. Then, control returns to step S1020.

At step S1050 to which control proceeds if a time-deficit task has not been identified at step S1015, the scheduler setter 741b treats the provisional activation time as being an in-1TS activation time, for all of the tasks registered at the task management table, and defines the "in-1TS activation time" of the task management table. Then, the present process is ended.

Figure 18:
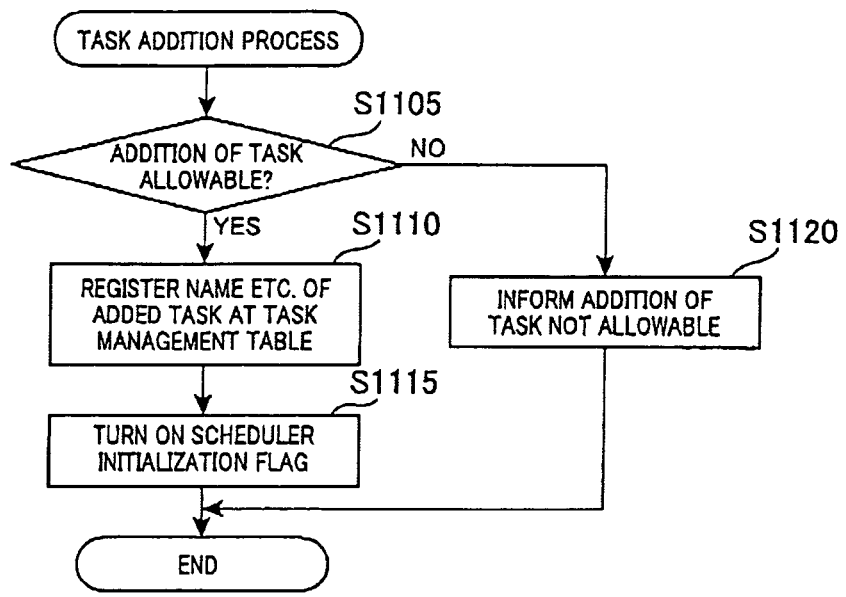
FIG. 18 is a flow diagram illustrating a task addition process according to the second embodiment.

Referring now to FIG. 18, a task addition process Is explained. FIG. 18 is a flow diagram illustrating the task addition process. In the task addition process, tasks to be scheduled are newly added. The present process is performed by the task addition/deletion receiver 741a when, for example, a user has requested addition of a task stored in a memory of the on-vehicle equipment 800, or when a new task has been downloaded as mentioned in the first embodiment.

At step S1105, the task addition/deletion receiver 741a determines whether or not addition of a new task is allowable. If an affirmative determination is made (Yes at step S1105), control proceeds to step S1110. If a negative determination is made (No at step S1105), control proceeds to step S1120.

Specifically, the task addition/deletion receiver 741a refers to the task management table to identify the "maximum activation duration" and the "required activation time" of each of the tasks. At the same time, for each of the tasks, the task addition/deletion receiver 741a calculates a value by dividing the required activation time by the maximum activation duration, and further calculates the sum of the values resulting from the divisions. If the sum is equal to or less than "1", addition of the new task is determined to be allowable. If the sum is larger than "1", addition of the new task is determined not to be allowable.

At step S1110, the task addition/deletion receiver 741a adds a record at the end of the task management table, the record corresponding to the new task to be added. The task addition/deletion receiver 741a also defines the individual items for the added record. Then, control proceeds to step S1115.

Specifically, the name of the task to be added is identified based on the binary data configuring the task and defines the item "name" of the added record. Then, a maximum activation duration and a required activation time are identified based on the binary data to define the items of the "maximum activation duration" and the "required activation time" for the added record.

At step S1115, the task addition/deletion receiver 741a turns on the scheduler initialization flag to thereby end the present process.

At step S1120 to which control proceeds if the addition of a task is not allowable, the task addition/deletion receiver 741a gives a notification that the addition of a task is not allowable via a display or the like, not shown, to thereby end the present process.

In the second embodiment, a task deletion process similar to the one in the first embodiment is performed by the task addition/deletion receiver 741a, in response, for example, to a user's operation or a signal issued from an external unit. Further, at the arrival of timing of the reference cycle, the scheduler setter 741b performs a periodical revision process similar to the one in the first embodiment. Explanation is omitted regarding the contents of the task deletion process and the periodical revision process.

In the scheduling section 741 of the control management unit 740 in the control program 700 according to the second embodiment, a maximum activation duration is divided by the sum of the maximum activation durations and the resultant value is multiplied by the TS. The time resulting from these calculations is used as a provisional activation time of each task. Accordingly, the TS can be divided without producing an excess time, for allocation to each of the tasks. Also, the provisional activation time is shared out from a task in which the provisional activation time is longer than the minimum activation time, to a task in which the provisional activation time is shorter than the minimum activation time. Thus, each of the tasks is allocated with a time equal to or more than the minimum activation time. Accordingly, no vacant period is produced in which no task is activated, whereby the TS can be divided into the operation times of the respective tasks and thus the tasks are more efficiently run.

[Modifications]

(1) Regarding the TSS of the first embodiment, an execution right has been assigned once to each of the TSS tasks during the period from the end of the DS up to the end of the TS. Alternative to this, these TSS tasks may be repeatedly assigned with an execution right in this period, so that the TSS tasks are constantly active up to the end of the TS. Thus, the vacant period, i.e. the time when no task is active, is prevented from being caused in each TS. In this way, tasks are more efficiently activated.

(2) In the first and second embodiments, the OS and the task in a virtual machine have been provided by implanting a program in the form of binary code, which program has been run in a different apparatus associated with the function to be re-created. However, the present invention is not limited to this. For example, the OS and the like may be produced based on a program implanted in the form of source code, which program has been run in a different apparatus. In this case as well, similar effects are achieved.

(3) In the second embodiment, the in-1TS activation time has been determined based on the provisional activation time which has been calculated using the required activation time and sum of the maximum activation durations. Thus, the vacant period, i.e. the time when no task is active, is prevented from being caused in each TS.

However, the scheduler setter 741*b* may determine the in-1TS activation time according to the following steps (a) to (c).

(a) Calculating a minimum activation time of each task registered at the task management table.

(b) Calculating an excess time that is a difference between a sum of the minimum activation times of the individual tasks and the TS. In this case, for example, a time of approximately a couple tenths of the TS may be set as a margin. Then, the margin may be subtracted from the difference between the sum of the minimum activation times of the individual tasks and the TS, to use the resultant value as the excess time.

(c) Evenly dividing the excess time by the number of the tasks registered at the task management table, for example, to set the time resulting from the addition of the divided time and the minimum activation time as the in-1TS activation time for each TS.

The proportion of dividing the excess time may be determined according to order of priority of the individual tasks, for example, so that more time may be allocated to the tasks having higher priority. Further, for example, all of the excess times may be allocated to the task having the highest priority among the tasks registered at the task management table. In this configuration as well, each TS is effectively utilized to efficiently activate the tasks.

(4) In the first embodiment, the TSS suspended degree has been changed (updated) according to whether or not the TSS task in question has been active over the in-1TS activation time, and then the TSS priority has been calculated based on the sum of the TSS fixed priority and the TSS suspended degree. However, the method of calculating the TSS priority is not limited to this. For example, the TSS priority may be Increased or decreased according to whether or not the TSS task in question has been active over the in-1TS activation time, without updating the TSS suspended degree. In this case as well, similar effects are achieved.

The following is a correlation between the terms used in the above embodiments and the terms used in the attached claims.

The in-1TS activation time corresponds to the activation time. The DS task (task to be subjected to DS) corresponds to the time-guaranteed task. The TSS task (task to be subjected to TSS) corresponds to the non-time-guaranteed task. The DS priority corresponds to the first priority. The TSS priority corresponds to the second priority.

In the activation task identification process, steps S215 and S225 correspond to the identification process and the identifying step. Similarly, step S245 corresponds to the assigning step, and step S240 corresponds to the depriving step.

Step S305 of the execution completion process corresponds to the completing step. Step S315 of the abandonment process corresponds to the abandoning step. Step S325 of the event-waiting process corresponds to the removing step. Step S335 of the event generation process corresponds to the restoring step.

Steps S415, S430 and S435 of the TS expiration process correspond to the updating step. Step S505 of the scheduler initialization process corresponds to the time slice setting step. Step S510 of the same process corresponds to the activation time setting step. Step S610 of the task addition process corresponds to the determining step, and step S615 of the same process corresponds to the adding step. In addition, Step S640 of the task deletion process to corresponds to the deleting step.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method for scheduling a plurality of tasks given in a vehicle, the method comprising:

producing periodical reference cycles repeated at a constant period, each of the reference cycles being given as a time slice, the tasks being given execution rights in sequence in the vehicle;

first performing the tasks, each of the tasks being given an in-1TS activation time required for each task in each time slice (TS) in order to ensure real-time performance of the task, the tasks including first type of tasks each of which is necessarily given the execution right during the in-1TS activation time thereof in each of the time slices and second type of tasks each of which is not necessarily given the execution right during the in-1TS activation time thereof in each of the time slices, a sum of the in-1TS activation times given to the first type of tasks in each of the time slices being smaller than a period of each of the time slices, the first type of tasks respectively being given a first priority used to give the execution right and the second type of tasks respectively being given a second priority used to give the execution right;

terminating, among the tasks, a specified task to which the execution right is given in a current time slice of the time slices, by depriving the execution right from the specified task, when a time during which the execution right continues reaches the in-1TS activation time given to the specified task, the current time slice being a time slice beginning after the latest one reference cycle;

second performing an identification process when each of the reference cycles has been completed or each of the tasks has been finished, wherein in the identification process, i) in cases where there remain, among the first type of tasks, remaining first type of tasks which have not been finished in the current time slice, a first type of task of which first priority is maximum among the remaining first type of tasks is identified, and ii) in cases where there remain no first type of tasks which have not been finished in the current slice, of remaining second type of tasks which are not finished yet in the current time slice, a second type of task of which second priority is maximum is identified; and assigning the execution right to the identified task through the identification process.

2. The method of claim 1, wherein each of the first type of tasks has a maximum activation duration and a required activation time, the maximum activation duration being a maximum activation duration allowed for normally activating functions realized by the first type of tasks, the required activation time being a provided time of the execution right necessary at minimum for activating the functions in the maximum activation duration, the method including steps of:
setting, as the time slice, the maximum activation duration which is shortest among the maximum activation durations of the first type of tasks to be scheduled; and
calculating a value by dividing the required activation time which is set to each of the first type of tasks to be scheduled by the maximum activation duration which is set to each of the first type of tasks to be scheduled;
calculating a minimum activation time of each of the first type of tasks by multiplying the calculated value by the time slice; and
setting, as the in-1TS activation time, a time which is longer than the minimum activation time of each of the first type of tasks such that a sum of the in-1TS activation times of all the first type of tasks is limited within the time slice.

3. The method of claim 2, further comprising steps of:
determining whether or not a predetermined abandonment condition for a task among the tasks is met, wherein the determination that the abandonment condition is met allows the task to voluntarily abandon the execution right given thereto; and
regarding that the task has been finished in the current time slice when the task abandons the execution right.

4. The method of claim 3, further comprising steps of:
determining whether or not a predetermined event-waiting condition for a task among the tasks is met, wherein the determination that the event-waiting condition is met allows the task to voluntarily abandon the execution right given thereto and to wait for an event to be generated for the task;
removing the task, which abandons the execution right and start waiting, from the tasks to be given the execution right so that the removed task is waiting for the event;
returning the waiting task to the tasks to be given the execution right when the event is generated,
wherein the second performing step include a step of applying the identification process to the tasks which are not waiting, and a step of allowing the identification process to be performed when the task is removed from the tasks to be given the execution right in the removing step.

5. The method of claim 4, wherein
the second performing step includes a step of performing the identification
process to identify the task returned by the returning step, and
the method comprising a step of depriving the tasks of the execution rights thereof to which the execution rights are given currently, when the performing step identifies the returned task in the returning step.

6. The method of claims 3, further comprising a step of updating the second priority assigned to the second type of tasks depending on whether or not each of the second type of tasks has been finished in the current time slice.

7. The method of claim 2, further comprising steps of:
determining whether or not a predetermined event-waiting condition for a
task among the tasks is met, wherein the determination that the event-waiting condition is met allows the task to voluntarily abandon the execution right given thereto and to wait for an event to be generated for the task;
removing the task, which abandons the execution right and start waiting, from the tasks to be given the execution right so that the removed task is waiting for the event;
returning the waiting task to the tasks to be given the execution right when the event is generated,
wherein the second performing step include a step of applying the identification process to the tasks which are not waiting, and a step of allowing the identification process to be performed when the task is removed from the tasks to be given the execution right in the removing step.

8. The method of claim 7, wherein
the second performing step includes a step of performing the identification process to identify the task returned by the returning step, and
the method comprising a step of depriving the tasks of the execution rights thereof to which the execution rights are given currently, when the performing step identifies the returned task in the returning step.

9. The method of claim 2, further comprising a step of updating the second priority assigned to the second type of tasks depending on whether or not each of the second type of tasks has been finished in the current time slice.

10. The method of claim 9, wherein the second priority is calculated on a fixed priority providing a fixed value of the priority and a suspended degree showing how much of the second type of tasks have not finished in each of the time slices, and
the updating step updates the second type of tasks by updating the suspended degree depending on whether or not each of the second type of tasks has been finished in the current time slice.

11. The method of claim 2, further comprising steps of:
removing the task to be scheduled so that the task is not scheduled; and
adding the task which has not been scheduled so that the task is newly added to be a task to be scheduled,
wherein the time slice setting step, the value calculating step, the minimum activation time calculating step, and the activation time setting step are repeated at intervals.

12. The method of claim 11, further comprising steps of:
determining whether or not, when a new task belonging to the first type of tasks to the tasks to be scheduled, it is possible to add the new task to the tasks to be scheduled, based on the maximum activation duration and the minimum activation time of the new task and the maximum activation durations and the minimum activation times of the first type of tasks to be scheduled,
wherein the adding step adds the new task to the tasks to be scheduled when the determining step determines that it is possible to add the new tasks to the tasks to be scheduled.

13. The method of claim 11, wherein the time slice setting step, the value calculating step, the minimum activation time calculating step, and the activation time setting step are executed every time when timing defined by the reference cycles is reached.

14. The method of claim 2, wherein at least one of the tasks is a virtual machine composed by a program re-create a function realized in an apparatus.

15. The method of claim 2, wherein the plurality of tasks control hardware devices mounted in the apparatus.

16. A computer-readable program stored in a memory, the program allowing the computer to realize functions of:

scheduling a plurality of tasks given in a vehicle that produces periodical reference cycles repeated at a constant period, each of the reference cycles being given as a time slice, the tasks being given execution rights in sequence, each of the tasks being given an in-1TS activation time required for each task in each time slice (TS) in order to ensure real-time performance of the task, the tasks including first type of tasks each of which is necessarily given the execution right during the in-1TS activation time thereof in each of the time slices and second type of tasks each of which is not necessarily given the execution right during the in-1TS activation time thereof in each of the time slices, a sum of the in-1TS activation times given to the first type of tasks in each of the time slices being smaller than a period of each of the time slices, the first type of tasks respectively being given a first priority used to give the execution right and the second type of tasks respectively being given a second priority used to give the execution right, terminating, among the tasks, a specified task to which the execution right is given in a current time slice of the time slices, by depriving the execution right from the specified task, when a time during which the execution right continues reaches the in-1TS activation time given to the specified task, the current time slice being a time slice beginning after the latest one reference cycle;

performing an identification process when each of the reference cycles has been completed or each of the tasks has been finished, wherein in the identification process, i) in cases where there remain, among the first type of tasks, remaining first type of tasks which have not been finished in the current time slice, a first type of task of which first priority is maximum among the remaining first type of tasks is identified, and ii) in cases where there remain no first type of tasks which have not been finished in the current slice, of remaining second type of tasks which are not finished yet in the current time slice, a second type of task of which second priority is maximum is identified; and assigning the execution right to the identified task through the identification process.

17. An apparatus for scheduling a plurality of tasks given in a vehicle, the apparatus comprising:

means for producing periodical reference cycles repeated at a constant period, each of the reference cycles being given as a time slice, the tasks being given execution rights in sequence in the vehicle, the apparatus comprises:

first performing means for performing the tasks, each of the tasks being given an in-1TS activation time required for each task in each time slice (TS) in order to ensure real-time performance of the task, the tasks including first type of tasks each of which is necessarily given the execution right during the in-1TS activation time thereof in each of the time slices and second type of tasks each of which is not necessarily given the execution right during the in-1TS activation time thereof in each of the time slices, a sum of the in-1TS activation times given to the first type of tasks in each of the time slices being smaller than a period of each of the time slices, the first type of tasks respectively being given a first priority used to give the execution right and the second type of tasks respectively being given a second priority used to give the execution right, terminating means for finishing, among the tasks, a specified task to which the execution right is given in a current time slice of the time slices, by depriving the execution right from the specified task, when a time during which the execution right continues reaches the in-1TS activation time given to the specified task, the current time slice being a time slice beginning after the latest one reference cycle;

second performing means for performing an identification process when each of the reference cycles has been completed or each of the tasks has been finished, wherein in the identification process, i) in cases where there remain, among the first type of tasks, remaining first type of tasks which have not been finished in the current time slice, a first type of task of which first priority is maximum among the remaining first type of tasks is identified, and ii) in cases where there remain no first type of tasks which have not been finished in the current slice, of remaining second type of tasks which are not finished yet in the current time slice, a second type of task of which second priority is maximum is identified; and assigning means for assigning the execution right to the identified task through the identification process.

18. The apparatus of claim 17, wherein the plurality of tasks control hardware devices mounted in the apparatus.

19. The apparatus of claim 17, wherein each of the first type of tasks has a maximum activation duration and a required activation time, the maximum activation duration being a maximum activation duration allowed for normally activating functions realized by the first type of tasks, the required activation time being a provided time of the execution right necessary at minimum for activating the functions in the maximum activation duration, the apparatus further comprising:

first setting means for setting, as the time slice, the maximum activation duration which is shortest among the maximum activation durations of the first type of tasks to be scheduled; and first calculating means for calculating a value by dividing the required activation time which is set to each of the first type of tasks to be scheduled by the maximum activation duration which is set to each of the first type of tasks to be scheduled;

second calculating means for calculating a minimum activation time of each of the first type of tasks by multiplying the calculated value by the time slice; and second setting means for setting, as the in-1TS activation time, a time which is longer than the minimum activation time of each of the first type of tasks such that a sum of the in-1TS activation times of all the first type of tasks is limited within the time slice.

20. The apparatus of claim 19, further comprising:

removing means for removing the task to be scheduled so that the task is not scheduled; and adding means for adding the task which has not been scheduled so that the task is newly added to be a task to be scheduled, wherein the time slice setting step, the value calculating step, the minimum activation time calculating step, and the activation time setting step are repeated at intervals.

21. The apparatus of claim 20, further comprising:

determining means for determining whether or not, when a new task belonging to the first type of tasks to the tasks to be scheduled, it is possible to add the new task to the tasks to be scheduled, based on the maximum activation duration and the minimum activation time of the new task and the maximum activation durations and the minimum activation times of the first type of tasks to be scheduled, wherein the adding step adds the new task to the tasks to be scheduled when the determining step determines that it is possible to add the new tasks to the tasks to be scheduled.

22. The apparatus of claim 19, further comprising:

determining means for determining whether or not a predetermined abandonment condition for a task among the tasks is met, wherein the determination that the abandonment condition is met allows the task to voluntarily abandon the execution right given thereto; and regarding means for regarding that the task has been finished in the current time slice when the task abandons the execution right.

23. The apparatus of claim 19, further comprising:

determining means for determining whether or not a predetermined event-waiting condition for a task among the tasks is met, wherein the determination that the event waiting condition is met allows the task to voluntarily abandon the execution right given thereto and to wait for an event to be generated for the task;

removing means for removing the task, which abandons the execution right and start waiting, from the tasks to be given the execution right so that the removed task is waiting for the event; and returning means for returning the waiting task to the tasks to be given the execution right when the event is generated, wherein the second performing means include applying means for applying the identification process to the tasks which are not waiting, and allowing means for allowing the identification process to be performed when the task is removed from the tasks to be given the execution right by the removing means.

24. The apparatus of claim 23, wherein the second performing means includes identification means for performing the identification process to identify the task returned by the returning means, and the apparatus comprising depriving means for depriving the tasks of the execution rights thereof to which the execution rights are given currently, when the identification means identifies the returned task by the returning means.

25. The apparatus of claim 19, further comprising;

updating means for updating the second priority assigned to the second type of tasks depending on whether or not each of the second type of tasks has been finished in the current time slice.

26. The apparatus of claim 25, wherein the second priority is calculated on a fixed priority providing a fixed value of the priority and a suspended degree showing how much of the second type of tasks have not finished in each of the time slices, and the updating means has the capability of updating the second type of tasks by updating the suspended degree depending on whether or not each of the second type of tasks has been finished in the current time slice.

* * * * *

UNITED STATES PATENT AND TRADEMARK OFFICE
CERTIFICATE OF CORRECTION

PATENT NO. : 8,595,746 B2
APPLICATION NO. : 12/927142
DATED : November 26, 2013
INVENTOR(S) : Shidai et al.

It is certified that error appears in the above-identified patent and that said Letters Patent is hereby corrected as shown below:

On the Title Page, column 2, Item [56], Other Publications, line 2, "translation." should be -- translation). --;

On the Title Page, column 2, Item [56], Other Publications, line 4, "translation." should be -- translation). --.

In the Claims

Column 29, Claim 4, line 46, after "event," insert -- and --;

Column 29, Claim 5, line 57, after "identification", delete "¶" break;

Column 30, Claim 7, line 3, after "a", delete "¶" break;

Column 30, Claim 7, line 10, after "event;", insert -- and --;

Column 31, Claim 16, line 24, delete "right," and insert -- right; --;

Column 32, Claim 17, line 3, delete "right," and insert -- right; --;

Column 32, Claim 19, line 43, after "and", insert -- ¶ break --;

Column 32, Claim 21, line 67, after "task", delete "¶" break;

Column 34, Claim 25, line 17, delete "comprising;", and insert -- comprising: --;

Column 34, Claim 25, line 19, after "second", delete "¶" break.

Signed and Sealed this
Twenty-second Day of July, 2014

Michelle K. Lee
*Deputy Director of the United States Patent and Trademark Office*